(12) United States Patent
Yashiro et al.

(10) Patent No.: US 11,505,193 B2
(45) Date of Patent: Nov. 22, 2022

(54) VEHICLE CONTROL APPARATUS, VEHICLE CONTROL METHOD, AND STORAGE MEDIUM

(71) Applicant: HONDA MOTOR CO., LTD., Tokyo (JP)

(72) Inventors: Katsuya Yashiro, Wako (JP); Ayumu Horiba, Wako (JP); Tadahiko Kanoh, Wako (JP); Chihiro Oguro, Wako (JP); Yuta Takada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 348 days.

(21) Appl. No.: 16/929,261

(22) Filed: Jul. 15, 2020

(65) Prior Publication Data

US 2021/0016778 A1    Jan. 21, 2021

(30) Foreign Application Priority Data

Jul. 17, 2019    (JP) .............................. JP2019-131639

(51) Int. Cl.
*B60W 30/12*    (2020.01)
*B60W 30/18*    (2012.01)
(Continued)

(52) U.S. Cl.
CPC ...... *B60W 30/18163* (2013.01); *B60W 10/04* (2013.01); *B60W 10/18* (2013.01);
(Continued)

(58) Field of Classification Search
None
See application file for complete search history.

(56) References Cited

U.S. PATENT DOCUMENTS 8,605,947 B2 * 12/2013 Zhang .................... G08G 1/167
                                                              348/148
8,665,079 B2 *  3/2014 Pawlicki ................... G06T 7/13
                                                              340/436

(Continued)

FOREIGN PATENT DOCUMENTS

JP    2016-014970    1/2016
JP    2016-212630    12/2016
(Continued)

OTHER PUBLICATIONS

Japanese Office Action for Japanese Patent Application No. 2019-131639 dated Mar. 16, 2021.

*Primary Examiner* — Jonathan M Dager
(74) *Attorney, Agent, or Firm* — Amin, Turocy & Watson, LLP

(57) ABSTRACT

A vehicle control apparatus includes a recognizer which is configured to recognize a surrounding environment of a host vehicle and a driving controller which is configured to perform automated driving on the basis of a recognition result of the recognizer, wherein the driving controller is configured to perform passing control of causing the host vehicle to pass a preceding vehicle if at least one of a first condition according to a relative speed of the host vehicle with respect to the preceding vehicle and a second condition according to a type of the preceding vehicle is satisfied when the recognizer recognizes the preceding vehicle, and is configured to curb the passing control by changing at least one of the first condition and the second condition when a continuity of a first route on which the host vehicle is traveling decreases.

16 Claims, 11 Drawing Sheets

(51) Int. Cl.
*B60W 60/00* (2020.01)
*B60W 10/20* (2006.01)
*B60W 10/18* (2012.01)
*B60W 10/04* (2006.01)

(52) U.S. Cl.
CPC .......... *B60W 10/20* (2013.01); *B60W 60/001* (2020.02); *B60W 2420/42* (2013.01); *B60W 2420/52* (2013.01); *B60W 2520/10* (2013.01); *B60W 2554/802* (2020.02); *B60W 2554/804* (2020.02); *B60W 2555/60* (2020.02)

(56) References Cited

U.S. PATENT DOCUMENTS

| | | | |
|---|---|---|---|
| 9,809,164 B2* | 11/2017 | Matsuno | B60W 30/18163 |
| 10,227,072 B2* | 3/2019 | Kubota | B60W 30/09 |
| 11,209,284 B2* | 12/2021 | Hwang | G01C 21/3492 |
| 11,209,828 B2* | 12/2021 | Niibo | G05D 1/0223 |
| 11,231,286 B2* | 1/2022 | Stentz | G05D 1/0274 |
| 11,242,060 B2* | 2/2022 | Jafari Tafti | G05D 1/0088 |
| 11,260,866 B2* | 3/2022 | Yu | B60W 30/0956 |
| 2006/0132295 A1* | 6/2006 | Gem | B60Q 9/008 340/438 |
| 2009/0182505 A1* | 7/2009 | Ikeda | G01S 13/931 701/301 |
| 2010/0161192 A1* | 6/2010 | Nara | B60W 30/18145 701/1 |
| 2011/0184605 A1* | 7/2011 | Neff | G05D 1/0255 701/25 |
| 2012/0288154 A1* | 11/2012 | Shima | G06T 7/174 382/103 |
| 2012/0296539 A1* | 11/2012 | Cooprider | B60W 30/188 701/1 |
| 2013/0151058 A1* | 6/2013 | Zagorski | G05D 1/0289 701/1 |
| 2015/0194055 A1* | 7/2015 | Maass | B60W 30/18163 340/905 |
| 2015/0224987 A1* | 8/2015 | Tachibana | G08G 1/166 701/1 |
| 2015/0360721 A1* | 12/2015 | Matsuno | B60W 30/18163 701/1 |
| 2016/0318518 A1* | 11/2016 | Suzuki | B60W 50/0097 |
| 2017/0162044 A1* | 6/2017 | Hu | G08G 1/0967 |
| 2017/0166124 A1* | 6/2017 | Nakagawa | G08G 1/166 |
| 2017/0203764 A1* | 7/2017 | Fujiki | B60W 10/04 |
| 2017/0232965 A1* | 8/2017 | Smith | B60W 50/10 701/93 |
| 2017/0259819 A1* | 9/2017 | Takeda | B60W 30/162 |
| 2017/0291603 A1* | 10/2017 | Nakamura | B60W 30/095 |
| 2017/0334451 A1* | 11/2017 | Asakura | B60W 50/082 |
| 2018/0074497 A1* | 3/2018 | Tsuji | G06V 20/59 |
| 2018/0089563 A1* | 3/2018 | Redding | G06N 3/0454 |
| 2018/0126990 A1* | 5/2018 | Shimada | B60W 30/12 |
| 2018/0178716 A1* | 6/2018 | Fujii | G08G 1/167 |
| 2018/0233034 A1* | 8/2018 | Tachibana | G08G 1/052 |
| 2018/0253975 A1* | 9/2018 | Mizutani | B60W 30/18163 |
| 2018/0281803 A1* | 10/2018 | Mukai | B60W 60/0027 |
| 2019/0047469 A1* | 2/2019 | Nishiguchi | B60Q 1/346 |
| 2019/0139415 A1* | 5/2019 | Sakaguchi | B60W 60/0015 |
| 2019/0168732 A1* | 6/2019 | Tashiro | B60W 10/06 |
| 2019/0250622 A1* | 8/2019 | Nister | B60W 60/0027 |
| 2019/0276029 A1* | 9/2019 | Umeda | B60W 10/18 |
| 2019/0278285 A1* | 9/2019 | Umeda | B60W 30/18154 |
| 2019/0283671 A1* | 9/2019 | Shimomura | B60W 30/143 |
| 2019/0291730 A1* | 9/2019 | Kamiya | G06V 20/58 |
| 2019/0347879 A1* | 11/2019 | Motomura | B60R 1/00 |
| 2019/0375412 A1* | 12/2019 | Ishioka | B60W 30/18163 |
| 2020/0023841 A1* | 1/2020 | Hayama | G01C 21/26 |
| 2020/0047750 A1* | 2/2020 | Likhachev | B60W 60/0015 |
| 2020/0108827 A1* | 4/2020 | Kanoh | B60W 30/18159 |
| 2020/0198649 A1* | 6/2020 | Emura | G08G 1/16 |
| 2020/0249684 A1* | 8/2020 | Onofrio | G05D 1/0219 |
| 2020/0355823 A1* | 11/2020 | Tingley | G01S 13/865 |
| 2020/0401160 A1* | 12/2020 | Lacaze | B60W 30/18163 |
| 2021/0009103 A1* | 1/2021 | Yashiro | B60W 10/06 |
| 2021/0009117 A1* | 1/2021 | Emura | B60W 50/085 |
| 2021/0046936 A1* | 2/2021 | Umeda | B60W 30/143 |
| 2021/0070288 A1* | 3/2021 | Yamaoka | B60W 30/09 |
| 2021/0086768 A1* | 3/2021 | Komoguchi | G08G 1/16 |
| 2021/0163009 A1* | 6/2021 | Spika | B60W 40/04 |
| 2021/0188166 A1* | 6/2021 | Yamamoto | B60Q 9/008 |
| 2021/0221367 A1* | 7/2021 | Hiramatsu | B60W 60/0015 |
| 2021/0291872 A1* | 9/2021 | Kondo | B60W 50/14 |
| 2021/0309217 A1* | 10/2021 | Kim | G08G 1/165 |
| 2022/0009522 A1* | 1/2022 | Zhang | B60W 30/12 |
| 2022/0063618 A1* | 3/2022 | Yasui | B60W 30/18163 |
| 2022/0073095 A1* | 3/2022 | Seitz | B60W 40/09 |
| 2022/0171590 A1* | 6/2022 | Seitz | B60K 35/00 |
| 2022/0203992 A1* | 6/2022 | Taniguchi | G08G 1/167 |

FOREIGN PATENT DOCUMENTS

| | | |
|---|---|---|
| JP | 2017-149254 | 8/2017 |
| JP | 2017-203638 | 11/2017 |
| JP | 2018-047737 | 3/2018 |
| WO | 2016/113926 | 7/2016 |

\* cited by examiner

FIG. 5
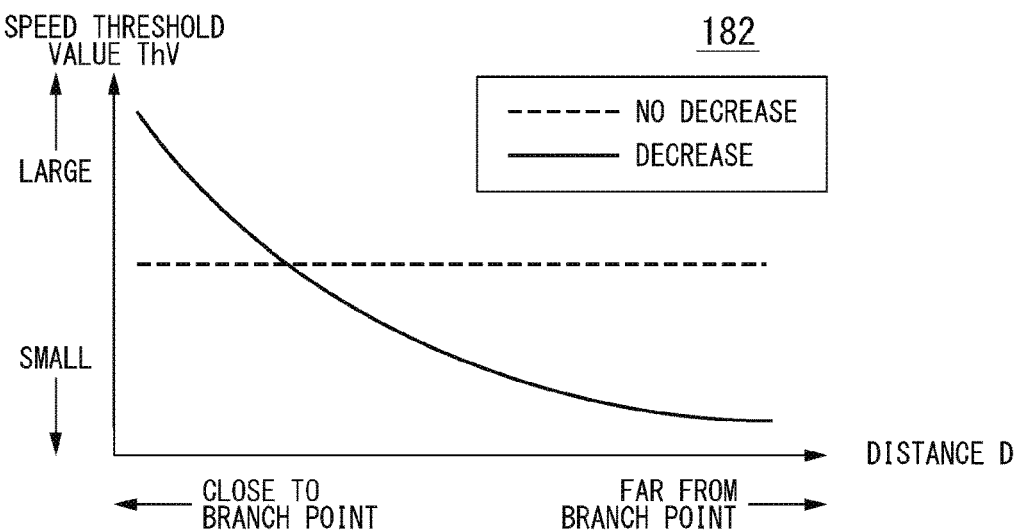
FIG. 6
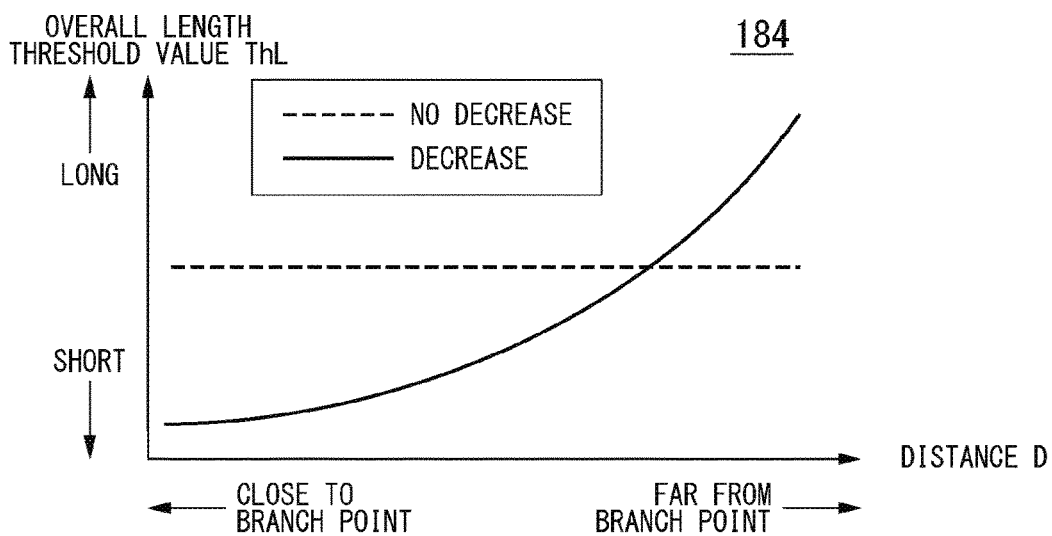
FIG. 7
| VEHICLE TYPE | OVERALL LENGTH | WIDTH | HEIGHT | ... |
|---|---|---|---|---|
| TYPE A | ** | ** | ** | ... |
| TYPE B | ** | ** | ** | ... |
| TYPE C | ** | ** | ** | ... |
| ... | ... | ... | ... | ... |

VEHICLE CONTROL APPARATUS, VEHICLE CONTROL METHOD, AND STORAGE MEDIUM

CROSS-REFERENCE TO RELATED APPLICATION

This application is based upon and claims the benefit of priority from Japanese Patent Application No. 2019-131639, filed Jul. 17, 2019, the entire content of which is incorporated herein by reference.

BACKGROUND

Field of the Invention

The present invention relates to a vehicle control apparatus, a vehicle control method, and a storage medium.

Description of Related Art

Recently, research on automated vehicle control has been conducted. In this regard, technology of determining whether a preceding vehicle is traveling in a passing lane at a speed lower than that of a host vehicle and performing control such that the host vehicle passes the preceding vehicle under predetermined conditions when it is determined that the preceding vehicle is traveling in the passing lane at a speed lower than that of the host vehicle is known (refer to Japanese Unexamined Patent Application, First Publication No. 2016-212630, for example). Further, technology of informing an occupant of a host vehicle that a current lane needs to be kept or controlling driving of the host vehicle such that the host vehicle is caused to keep the current lane when the host vehicle cannot return to a previous lane according to a road environment or a travel situation when the host vehicle changes lanes to another lane in order to pass a preceding vehicle is known (refer to Japanese Unexamined Patent Application, First Publication No. 2017-203638, for example).

SUMMARY

In the conventional technologies, there are cases in which a host vehicle is not able to pass a preceding vehicle even when an occupant wants to pass the preceding vehicle or the host vehicle passes the preceding vehicle even when the occupant does not want to pass the preceding vehicle and thus passing control close to the feelings of the occupant may not be able to be performed.

One aspect of the present invention provides a vehicle control apparatus, a vehicle control method, and a storage medium which can perform passing control closer to the feelings of an occupant.

A vehicle control apparatus, a vehicle control method, and a storage medium according to the present invention employ the following configurations.

One aspect (1) of the present invention is a vehicle control apparatus including: a recognizer which is configured to recognize a surrounding environment of a host vehicle; and a driving controller which is configured to perform automated driving of controlling at least one of a speed and steering of the host vehicle on the basis of the recognition result of the recognizer, wherein the driving controller is configured to perform passing control of causing the host vehicle to pass a preceding vehicle present in front of the host vehicle in a host lane in which the host vehicle is present if at least one of a first condition according to a relative speed of the host vehicle with respect to the preceding vehicle and a second condition according to a type of the preceding vehicle is satisfied when the recognizer recognizes the preceding vehicle, and is configured to curb the passing control by changing at least one of the first condition and the second condition when a continuity of a first route on which the host vehicle is traveling decreases.

In an aspect of (2), in the vehicle control apparatus of the aspect of (1), the first condition includes a condition that the relative speed of the host vehicle with respect to the preceding vehicle is equal to or greater than a first threshold value, the second condition includes a condition that the type of the preceding vehicle is consistent with any of a plurality of predetermined vehicle types, and the driving controller is configured to curb the passing control by increasing the first threshold value or limiting the plurality of vehicle types.

In an aspect of (3), in the vehicle control apparatus of the aspect of (2), the driving controller is configured to increase the first threshold value or limits a larger number of the plurality of vehicle types as a continuity of the first route decreases.

In an aspect of (4), in the vehicle control apparatus of any one of the aspects of (1) to (3), decrease in the continuity of the first route includes decrease in a distance between the host vehicle and a branch point at which a second route on which a vehicle traveling direction differs from the first route is branched from the first route, and the driving controller is configured to curb the passing control in response to decrease in the distance between the branch point and the host vehicle.

In an aspect of (5), the vehicle control apparatus of the aspect of (4) further includes an inputter to which a destination is input, wherein, when the destination input to the inputter is present ahead of the second route, the driving controller is configured to curb the passing control in response to decrease in the distance between the branch point to the second route and the host vehicle.

In an aspect of (6), the vehicle control apparatus of the aspect of (4) further includes an inputter to which a destination is input, wherein, when the destination is not input to the inputter, the driving controller is configured to curb the passing control in response to decrease in a distance between the host vehicle and a branch point at which the host vehicle is assumed to arrive after traveling a predetermined distance or for a predetermined time on the first route.

In an aspect of (7), in the vehicle control apparatus of the aspect of (6), when the host vehicle is assumed to arrive at a plurality of branch points after traveling a predetermined distance or for a predetermined time on the first route, the driving controller is configured to curb the passing control when the host vehicle approaches each of the plurality of branch points.

In an aspect of (8), in the vehicle control apparatus of the aspect of (7), the driving controller is configured to curb the passing control more strongly for a branch point farther from the host vehicle from among the plurality of branch points.

In an aspect of (9), the vehicle control apparatus of any one of the aspects (1) to (8) further includes an inputter to which a reference speed of the host vehicle in the automated driving is input, wherein, when the reference speed input to the inputter is lower than a speed limit of the first route, the driving controller is configured to curb the passing control as compared to a case in which the reference speed is higher than the speed limit.

In an aspect of (10), in the vehicle control apparatus of the aspect of (9), the driving controller is configured to curb the passing control more strongly as a difference between the reference speed and the speed limit decreases when the reference speed is higher than the speed limit.

In an aspect of (11), in the vehicle control apparatus of any one of the aspects of (1) to (10), the first condition includes a condition that the relative speed of the host vehicle with respect to the preceding vehicle is equal to or greater than a first threshold value, the second condition includes a condition that an overall length of the preceding vehicle is equal to or less than a second threshold value, and the driving controller is configured to curb the passing control by increasing the first threshold value or decreasing the second threshold value.

In an aspect of (12), in the vehicle control apparatus of the aspect of (11), the driving controller is configured to not curb the passing control when the type of the preceding vehicle is a first vehicle type having a vehicle overall length equal to or less than the second threshold value and is configured to curb the passing control when the type of the preceding vehicle is a second vehicle type having a vehicle overall length greater than the second threshold value.

In an aspect of (13), the vehicle control apparatus of any one of the aspects of (1) to (12) further includes a detector which detects an operation of an occupant of the host vehicle to instruct automated lane change, wherein the driving controller is configured to curb the passing control on the basis of the number of times of detecting the operation by the detector.

In an aspect of (14), in the vehicle control apparatus of the aspect of (13), the driving controller is configured to curb the passing control more strongly as the number of times of detecting the operation by the detector decreases.

Another aspect (15) of the present invention is a vehicle control method, using a computer mounted in a host vehicle, including: recognizing a surrounding environment of a host vehicle; performing automated driving of controlling at least one of a speed and steering of the host vehicle on the basis of the recognition result; performing passing control of causing the host vehicle to pass a preceding vehicle present in front of the host vehicle in a host lane in which the host vehicle is present if at least one of a first condition according to a relative speed of the host vehicle with respect to the preceding vehicle and a second condition according to a type of the preceding vehicle is satisfied when the preceding vehicle is recognized; and curbing the passing control by changing at least one of the first condition and the second condition when a continuity of a first route on which the host vehicle is traveling decreases.

Another aspect (16) of the present invention is a computer-readable non-transitory storage medium storing program for causing a computer mounted in a host vehicle to execute: recognizing a surrounding environment of the host vehicle; performing automated driving of controlling at least one of a speed and steering of the host vehicle on the basis of the recognition result; performing passing control of causing the host vehicle to pass a preceding vehicle present in front of the host vehicle in a host lane in which the host vehicle is present if at least one of a first condition according to a relative speed of the host vehicle with respect to the preceding vehicle and a second condition according to a type of the preceding vehicle is satisfied when the preceding vehicle is recognized; and curbing the passing control by changing at least one of the first condition and the second condition when a continuity of a first route on which the host vehicle is traveling decreases.

According to the above-described aspect, it is possible to perform passing control closer to the feelings of an occupant.

BRIEF DESCRIPTION OF THE DRAWINGS

FIG. 5 is a diagram showing an example of speed threshold value information according to the first embodiment.

FIG. 6 is a diagram showing an example of overall length threshold value information according to the first embodiment.

FIG. 7 is a diagram showing an example of vehicle type information according to the first embodiment.

DESCRIPTION OF EMBODIMENTS

Hereinafter, embodiments of a vehicle control apparatus, a vehicle control method, and a storage medium of the present invention will be described with reference to the drawings. As used throughout this disclosure, the singular forms "a," "an," and "the" include plural reference unless the context clearly dictates otherwise. The vehicle control apparatus of embodiments is applied to, for example, vehicles for automated driving. Automated driving is controlling one or both of steering and acceleration/deceleration of a vehicle to perform driving control, for example. The aforementioned driving control includes, for example, driving control such as an adaptive cruise control (ACC) system, traffic jam pilot (TJP), auto lane changing (ALC), a collision mitigation brake system (CMBS), and a lane keeping assistance system (LKAS). With respect to vehicles for automated driving, driving control according to manual driving of an occupant (driver) may be executed. Although cases in which the law of the left-hand traffic is applied will be described hereinafter, left and right may be reversed when the law of the right-handed traffic is applied. Hereinafter, description will be given on the assumption that one direction in a horizontal direction is X, another direction is Y, and a vertical direction perpendicular to the horizontal directions X-Y is Z.

First Embodiment

[Overall Configuration]

Figure 1:
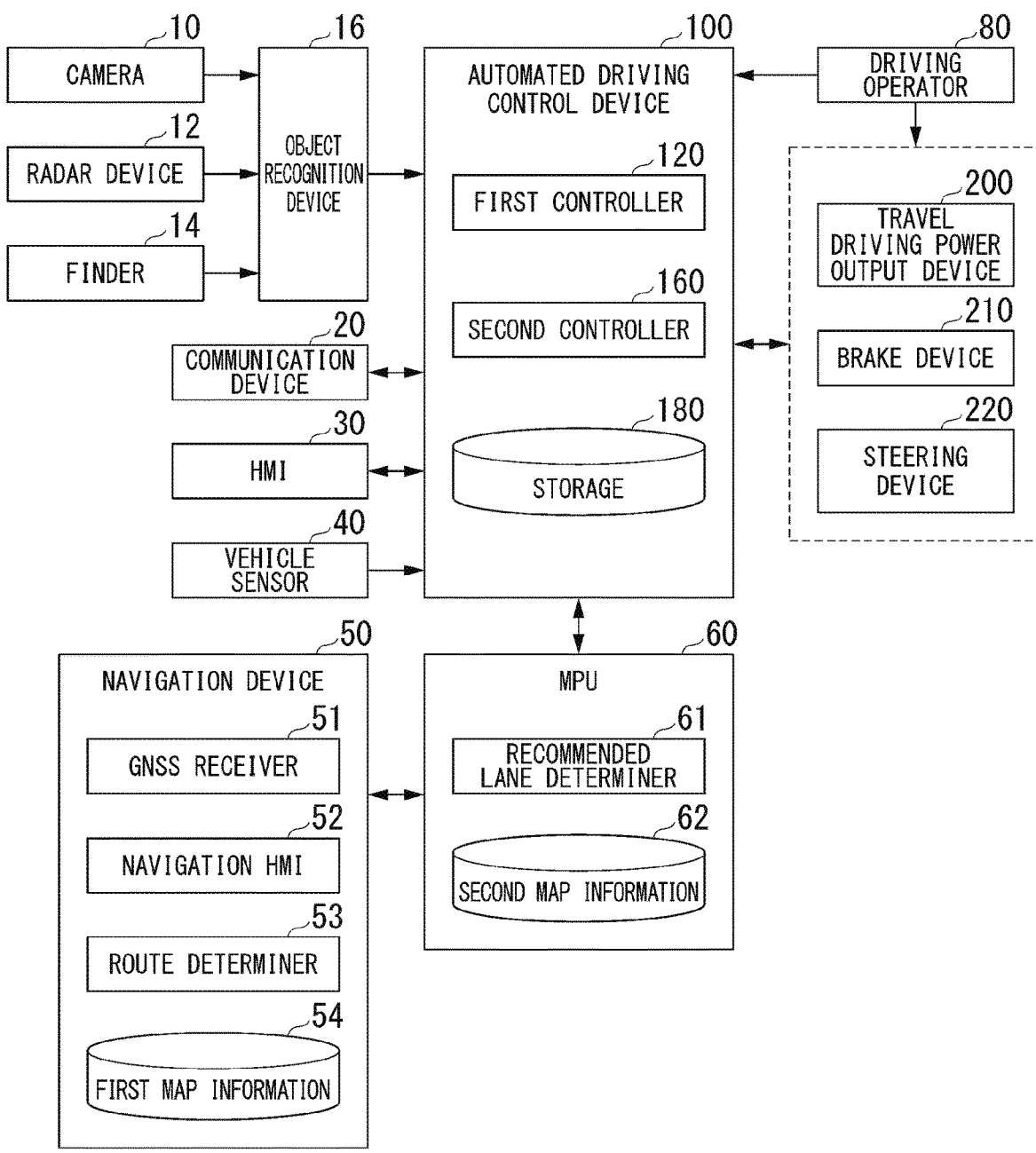
FIG. 1 is a configuration diagram of a vehicle system using a vehicle control apparatus according to a first embodiment.

FIG. 1 is a configuration diagram of a vehicle system 1 using a vehicle control apparatus according to a first embodiment. A vehicle (hereinafter referred to as a host vehicle M) mounted with the vehicle system 1 may be, for example, a two-wheeled, three-wheeled, four-wheeled vehicle or the like and a driving source thereof includes an internal combustion engine such as a diesel engine or a gasoline engine, a motor, or a combination thereof. The motor operates using power generated by a generator connected to the internal combustion engine or power discharged from a secondary battery or a fuel battery.

For example, the vehicle system 1 may include a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving power output device 200, a brake device 210, and a steering device 220. These devices and apparatuses are connected through a multiplex communication line such as a controller area network (CAN) communication line, a serial communication line, a wireless communication network, and the like. The configuration shown in FIG. 1 is merely an example and some of the components may be omitted or other components may be further added. The automated driving control device 100 is an example of a "vehicle control device."

For example, the camera 10 may be a digital camera using a solid state imaging device such as a charge coupled device (CCD) or a complementary metal oxide semiconductor (CMOS). The camera 10 is attached to any position on the host vehicle M. When a front view image of the host vehicle M is captured, for example, the camera 10 is attached to the upper part of the front windshield, the rear side of a rear view mirror, or the like. When a rear view image of the host vehicle M is captured, the camera 10 is attached to the upper part of the rear windshield, or the like. When a right-side view or a left-side view of the host vehicle M is captured, the camera 10 is attached to the right side or the left side of the vehicle body or the door mirror, or the like. For example, the camera 10 may periodically repeatedly capture images of the surroundings of the host vehicle M. The camera 10 may be a stereo camera.

The radar device 12 radiates electric waves such as millimeter waves to the surroundings of the host vehicle M and detects electric waves reflected by an object (reflected waves) to detect at least the position of (distance to and direction of) the object. The radar device 12 is attached to any position on the host vehicle M. The radar device 12 may detect the position and speed of an object according to a frequency modulated continuous wave (FM-CW) method.

The finder 14 is a light detection and ranging (LIDAR) device. The finder 14 radiates light to the surroundings of the host vehicle M and measures scattering light. The finder 14 detects a distance to a target on the basis of a time from light emission to light reception. Radiated light may be pulse-shaped laser light, for example. The finder 14 is attached to any position on the host vehicle M.

The object recognition device 16 performs a sensor fusion process on detection results of some or all of the camera 10, the radar device 12 and the finder 14 to recognize the position, type, speed and the like of an object. The object recognition device 16 outputs a recognition result to the automated driving control device 100. The object recognition device 16 may output detection results of the camera 10, the radar device 12 and the finder 14 to the automated driving control device 100 as they are. In this case, the object recognition device 16 may be omitted from the vehicle system 1.

The communication device 20 communicates with other vehicles around the host vehicle M using a cellular network, a Wi-Fi network, Bluetooth (registered trademark), dedicated short range communication (DSRC), and the like, for example, or communicates with various server devices through a wireless base station.

The HMI 30 presents various types of information to an occupant (including a driver) of the host vehicle M and receives an input operation from the occupant. The HMI 30 includes, for example, various display devices, speakers, buzzers, touch panels, microphones, switches, keys, etc. For example, an occupant inputs a destination of the host vehicle M to the HMI 30. The HMI 30 is an example of an "inputter."

The vehicle sensor 40 includes a vehicle speed sensor that detects the speed of the host vehicle M, an acceleration sensor that detects an acceleration, a yaw rate sensor that detects an angular velocity around a vertical axis, a heading sensor that detects the direction of the host vehicle M, etc.

The navigation device 50 may include a global navigation satellite system (GNSS) receiver 51, a navigation HMI 52 and a route determiner 53, for example. The navigation device 50 stores first map information 54 in a storage device such as a hard disk drive (HDD) or a flash memory. The GNSS receiver 51 identifies the position of the host vehicle M on the basis of signals received from a GNSS satellite. The position of the host vehicle M may be identified or complemented for by an inertial navigation system (INS) using the output of the vehicle sensor 40.

The navigation HMI 52 includes a display device, a speaker, a touch panel, keys, etc. A part or all of the navigation HMI 52 and the aforementioned HMI 30 may be made to be common. For example, an occupant may input a destination of the host vehicle M to the navigation HMI 52 instead of or in addition to inputting the destination of the host vehicle M to the HMI 30. The navigation HMI 52 is another example of an "inputter."

The route determiner 53 determines a route (hereinafter, a route on a map) to a destination input by an occupant using the HMI 30 or the navigation HMI 52 from the position of the host vehicle M identified by the GNSS receiver 51 (or any input position) with reference to the first map information 54, for example.

The first map information 54 may be information in which road shapes are represented according to links indicating roads and nodes connected by links, for example. The first map information 54 may include curvatures of roads and point-of-interest (POI) information, and the like. A route on a map is output to the MPU 60.

The navigation device 50 may perform route guide using the navigation HMI 52 on the basis of roads on a map. For example, the navigation device 50 may be realized by functions of a terminal device such as a smartphone or a tablet terminal possessed by an occupant. The navigation device 50 may transmit a current position and a destination to a navigation server through the communication device 20 and acquire the same route as a route on a map from the navigation server.

The MPU 60 includes a recommended lane determiner 61, for example, and stores second map information 62 in a storage device such as an HDD or a flash memory. The recommended lane determiner 61 divides a route on a map provided from the navigation device 50 into a plurality of blocks (divides the route into intervals of 100 m in a vehicle traveling direction, for example) and determines a recommended lane for each block with reference to the second map information 62. The recommended lane determiner 61 performs determination in such a manner that on which lane from the left the vehicle will travel is determined. When a route on a map includes a branch point, the recommended lane determiner 61 determines recommended lanes such that the host vehicle M can travel on a reasonable route for traveling to a branch destination.

The second map information 62 is map information with higher-accuracy than the first map information 54. For example, the second map information 62 may include information on the centers of lanes, information on the boundaries of lanes, or the like. The second map information 62 may include road information, traffic regulations information, address information (addresses and zip codes), facility information, telephone number information, etc. The second map information 62 may be updated at any time through communication between the communication device 20 and other devices.

The driving operator 80 may include an accelerator pedal, a brake pedal, a shift lever, a steering wheel, a modified steering wheel, a joystick, and other operators, for example. A sensor that detects an operation amount or presence or absence of an operation is attached to the driving operator 80 and a detection result thereof is output to the automated driving control device 100 or some or all of the travel driving power output device 200, the brake device 210 and the steering device 220.

The automated driving control device 100 may include a first controller 120, a second controller 160, and a storage 180, for example. Each of the first controller 120 and the second controller 160 may be realized by a hardware processor such as a central processing unit (CPU) or a graphics processing unit (GPU) executing a program (software), for example. Some or all of these components may be realized by hardware (circuit; including circuitry) such as a large scale integration (LSI) circuit, an application specific integrated circuit (ASIC), and a field-programmable gate array (FPGA) or realized by software and hardware in cooperation. Programs may be stored in advance in a storage device (storage device including a non-transitory storage medium) of the automated driving control device 100, such as an HDD or a flash memory, or stored in a detachable storage medium such as a DVD or a CD-ROM and installed in the HDD or the flash memory of the automated driving control device 100 by setting the storage medium (non-transitory storage medium) in a drive device.

The storage 180 is realized by the aforementioned various storage devices. The storage 180 may be realized, for example, by an HDD, a flash memory, an electrically erasable programmable read only memory (EEPROM), a read only memory (ROM), a random access memory (RAM), or the like. The storage 180 may store, for example, information such as speed threshold value information 182, overall length threshold value information 184 and vehicle type information 186 in addition to programs read and executed by a processor. The speed threshold value information 182, the overall length threshold value information 184 and the vehicle type information 186 will be described in detail later.

Figure 2:
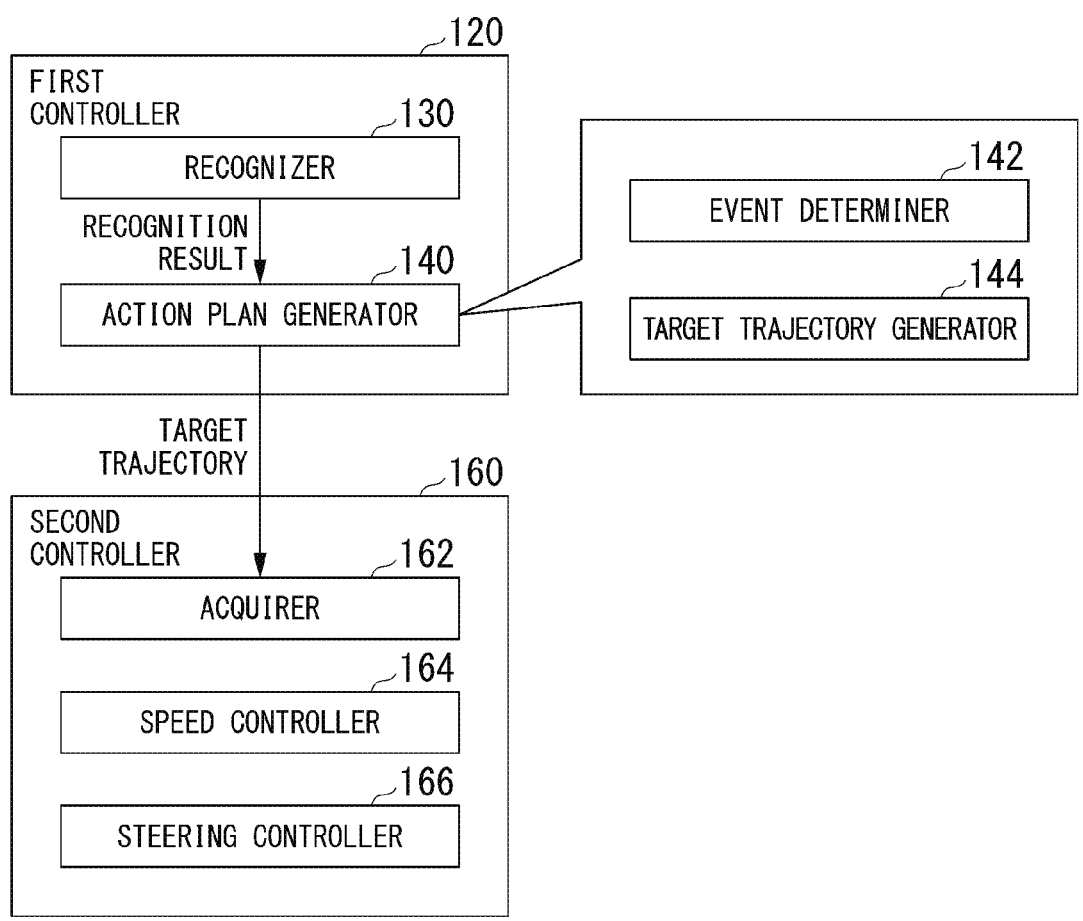
FIG. 2 is a functional configuration diagram of a first controller and a second controller according to the first embodiment.

FIG. 2 is a functional configuration diagram of the first controller 120 and the second controller 160 according to the first embodiment. The first controller 120 may include a recognizer 130 and an action plan generator 140, for example.

The first controller 120 may realize a function using artificial intelligence (AI) and a function using a model provided in advance in parallel, for example. For example, a function of "recognizing an intersection" may be realized by performing recognition of an intersection using deep learning or the like and recognition according to conditions provided in advance (which include a signal which can be pattern-matched, road markings and the like) in parallel and assigning scores to results of both the recognitions to integrally evaluate the recognition results. Accordingly, reliability of automated driving is secured.

The recognizer 130 recognizes the surrounding environment of the host vehicle M. For example, the recognizer 130 may recognize objects around the host vehicle M on the basis of information input from the camera 10, the radar device 12, and the finder 14 through the object recognition device 16. Objects recognized by the recognizer 130 include, for example, bicycles, motorcycles, four-wheeled vehicles, pedestrians, traffic signs, road markings, lane markings, telephone poles, guardrails, falling objects, etc. The recognizer 130 recognizes states such as the position, speed and acceleration of an object. For example, the position of an object may be recognized as a position on relative coordinates having a representative point (the center of gravity, the center of the drive shaft or the like) of the host vehicle M as the origin (that is, a relative position with respect to the host vehicle M) and used for control. The position of an object may be represented as a representative point of the object, such as the center of gravity or a corner of the object, or may be represented as a representative region. "States" of an object may include the acceleration and jerk of the object or an "action state" (e.g., whether lane change is being performed or is intended to be performed).

The recognizer 130 recognizes, for example, a host lane in which the host vehicle M is traveling, neighboring lanes neighboring the host lane, and the like. For example, the recognizer 130 may recognize the host lane, neighboring lanes, and the like by comparing a lane marking pattern (e.g., arrangement of solid lines and dashed lines) obtained from the second map information 62 with a lane marking pattern around the host vehicle M recognized from an image captured by the camera 10.

The recognizer 130 may recognize lanes such as the host lane and neighboring lanes by recognizing traveling course boundaries (road boundaries) including lane markings, road shoulders, curbs, medians, guardrails and the like as well as lane markings. In this recognition, the position of the host vehicle M acquired form the navigation device 50 and a processing result of the INS may be taken into account. The recognizer 130 recognizes stop lines, obstacles, red signals, tollgates, and other road events.

The recognizer 130 recognizes a relative position and an attitude of the host vehicle M with respect to the host lane when the host lane is recognized. For example, the recognizer 130 may recognize a distance between a representative point of the host vehicle M and the center of the lane and an angle between a traveling direction of the host vehicle M and a line connecting the center of the lane as a relative position and attitude of the host vehicle M with respect to the host lane. Instead of this, the recognizer 130 may recognize the position of the representative point of the host vehicle M or the like with respect to any side edge of the host lane (a lane marking or a road boundary) as a relative position of the host vehicle M with respect to the host lane.

The action plan generator 140 includes, for example, an event determiner 142 and a target trajectory generator 144. When the host vehicle M is under automated driving in a route for which recommended lanes have been determined, the event determiner 142 determines a travel state of the automated driving. Information defining a travel state of automated driving is referred to as an event in the following description.

Events include, for example, a constant-speed travel event of causing the host vehicle M to travel in the same travel lane at a constant speed, a following travel event of causing the host vehicle M to follow another vehicle (hereinafter referred to as a preceding vehicle mA) which is present in front of the host vehicle M in the host lane within a predetermined distance (e.g., 100 m) from the host vehicle M and is closest to the host vehicle M, a lane change event of causing the host vehicle M to change lanes from the host lane to a neighboring lane, a branch event of causing the host vehicle M to be branched to a lane on a destination side at a branch point of a road, a merging event of causing the host vehicle M to be merged into a main line at a merging point, a takeover event for ending automated driving and switching to manual driving, and the like. For example, "following" may be a travel state in which a distance (relative distance) between the host vehicle M and the preceding vehicle mA is maintained uniform, or a travel state in which the host vehicle M is caused to travel at the center of the host lane while maintaining the vehicle-to-vehicle distance between the host vehicle M and the preceding vehicle mA uniform. Events may include, for example, a passing event of causing the host vehicle M to change lanes to a neighboring lane once to pass the preceding vehicle mA in the neighboring lane and then change lanes to the previous lane, an avoidance event of causing the host vehicle M to perform at least one of braking and steering in order to avoid an obstacle present in front of the host vehicle, and the like.

For example, the event determiner 142 may change an event that has already been determined for a current section to another event or determine a new event for the current section according to a surrounding situation recognized by the recognizer 130 when the host vehicle M is traveling.

The event determiner 142 may change an event that has already been determined for the current section to another event or determine a new event for the current section according to an operation of an occupant performed on an on-board device. For example, when an occupant operates a winker, the event determiner 142 may change an event that has already been determined for the current section to the lane change event or newly determine the lane change event for the current section.

For example, when an occupant operates a winker lever (also called a stoke or a switch) for a predetermined time (e.g., for several seconds) to instruct lane change to a neighboring lane on the left side, the event determiner 142 determines a lane change event of causing the host vehicle M to change lanes to a neighboring lane on the left side viewed from the host vehicle M. For example, when an occupant operates the winker lever to instruct lane change to a neighboring lane on the right side, the event determiner 142 determines a lane change event of causing the host vehicle M to change lanes to a neighboring lane on the right side viewed from the host vehicle M. Instructing lane change by operating the winker lever is also called a one-touch function. Instructing of lane change may be performed by operating the steering wheel, inputting voice to a microphone or operating other switches or buttons in addition to or instead of operating the winker lever.

The target trajectory generator 144 generates a target trajectory through which the host vehicle M will automatically travel (without depending on an operation of a driver) in the future in a travel state designated by an event such that the host vehicle M travels in a recommended lane determined by the recommended lane determiner 61 in principle and copes with a surrounding situation thereof when the host vehicle M travels in the recommended lane. For example, a target trajectory may include a position factor determining a future position of the host vehicle M and a speed factor determining a future speed and the like of the host vehicle M.

For example, the target trajectory generator 144 may determine a plurality of points (trajectory points) at which the host vehicle M will sequentially arrive as a position factor of a target trajectory. A trajectory point is a point at which the host vehicle M will arrive for each predetermined traveling distance (e.g., approximately several meters). The predetermined traveling distance may be calculated by a distance along a road when the host vehicle M travels along a route, for example.

The target trajectory generator 144 determines a target speed and a target acceleration for each predetermined sampling time (e.g., approximately every several tenths of a second) as speed factors of a target trajectory. A trajectory point may be a position at which the host vehicle M will arrive at a sampling time for each predetermined sampling time. In this case, the target speed and the target acceleration are determined by the sampling time and a spacing between trajectory points. The target trajectory generator 144 outputs information representing the generated target trajectory to the second controller 160.

The second controller 160 controls the travel driving power output device 200, the brake device 210 and the steering device 220 such that the host vehicle M passes through a target trajectory generated by the target trajectory generator 144 on scheduled time. For example, the second controller 160 may include an acquirer 162, a speed controller 164 and a steering controller 166. A combination of the action plan generator 140 and the second controller 160 is an example of a "driving controller."

The acquirer 162 acquires information on a target trajectory (trajectory points) from the target trajectory generator 144 and stores the information in a memory of the storage 180.

The speed controller 164 controls one or both of the travel driving power output device 200 and the brake device 210 on the basis of a speed factor (e.g., a target speed, a target acceleration, and the like) included in the target trajectory stored in the memory.

The steering controller 166 controls the steering device 220 in response to a position factor (e.g., a curvature that indicates a degree of bending of the target trajectory, or the like) included in the target trajectory stored in the memory. Processing of the speed controller 164 and the steering controller 166 may be realized by feedforward control and feedback control in combination, for example. As an example, the steering controller 166 performs feedforward control according to a curvature of a road ahead of the host vehicle M and feedback control according to a deviation from a target trajectory in combination.

The travel driving power output device 200 outputs a travel driving power (torque) for traveling of a vehicle to driving wheels. For example, the travel driving power output device 200 may include a combination of an internal combustion engine, a motor, a transmission and the like, and a power electronic control unit (ECU) which controls these components. The power ECU controls the aforementioned components according to information input from the second controller 160 or information input from the driving operator 80.

The brake device 210 may include a brake caliper, a cylinder which transfers a hydraulic pressure to the brake caliper, an electric motor which generates a hydraulic pressure in the cylinder, and a brake ECU, for example. The brake ECU controls the electric motor according to information input from the second controller 160 or information input from the driving operator 80 such that a brake torque according to a braking operation is output to each vehicle wheel. The brake device 210 may include a mechanism for transferring a hydraulic pressure generated by an operation of the brake pedal included in the driving operator 80 to the cylinder through a master cylinder as a backup. The brake device 210 is not limited to the above-described configuration and may be an electronically controlled hydraulic brake device which controls an actuator according to information input from the second controller 160 and transfers a hydraulic pressure of a master cylinder to a cylinder.

The steering device 220 may include a steering ECU and an electric motor, for example. For example, the electric motor may change the direction of the steering wheel by applying a force to a rack-and-pinion mechanism. The steering ECU drives the electric motor according to information input from the second controller 160 or information input from the driving operator 80 to change the direction of the steering wheel.

[Processing flow]

Figure 3:
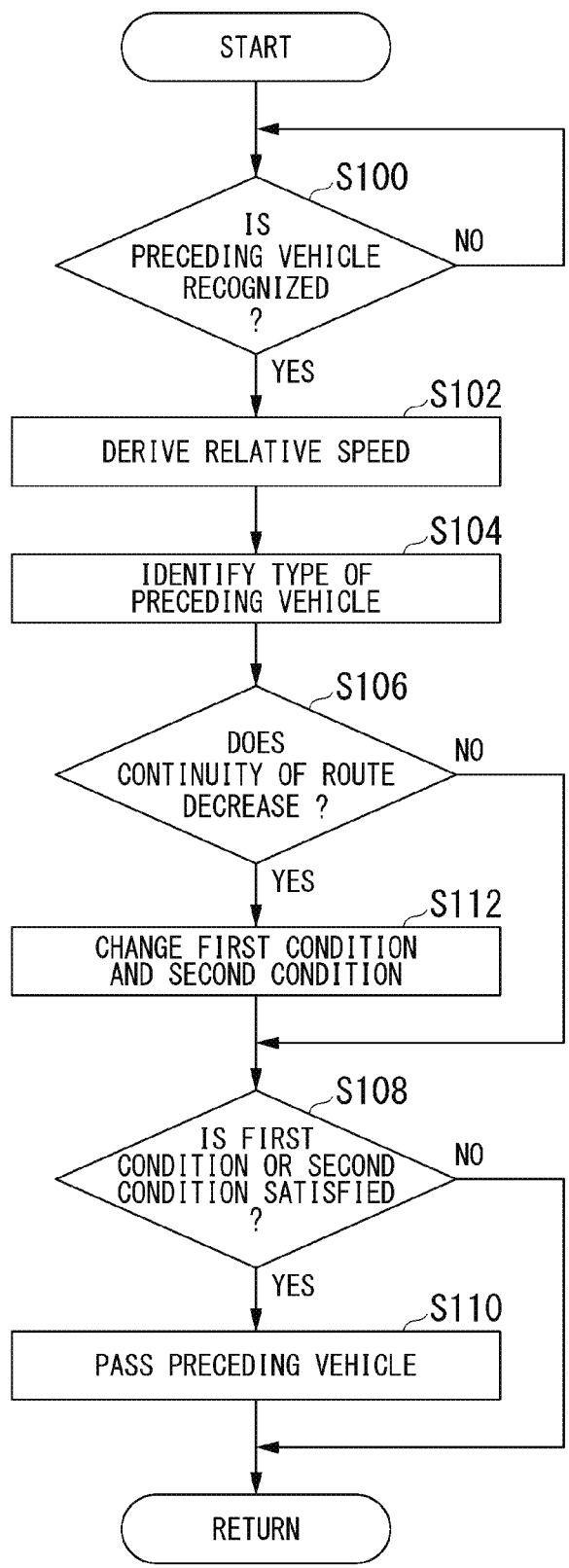
FIG. 3 is a flowchart showing an example of a flow of a series of processes performed by an automated driving control device according to the first embodiment.

Hereinafter, a flow of a series of processes performed by the automated driving control device 100 according to the first embodiment will be described using a flowchart. FIG. 3 is a flowchart showing an example of a flow of a series of processes performed by the automated driving control device 100 according to the first embodiment. Processing of this flowchart may be repeatedly executed, for example, at predetermined time intervals.

First, the action plan generator 140 waits until the preceding vehicle mA is recognized by the recognizer 130 (step S100) and derives a relative speed Vr of the host vehicle M with respect to the preceding vehicle mA when the preceding vehicle mA is recognized by the recognizer 130 (step S102). For example, the relative speed Vr may be a speed difference obtained by subtracting the speed of the preceding vehicle mA from the speed of the host vehicle M.

Next, the action plan generator 140 identifies the type of the preceding vehicle mA recognized by the recognizer 130 (step S104). For example, the action plan generator 140 may identify whether the preceding vehicle mA is any of vehicle types such as an ordinary vehicle, a small-sized vehicle, a mid-sized vehicle, and a large-sized vehicle on the basis of the shape, dimensions, pattern, color, number, and the like of a reflector attached to the back of the preceding vehicle mA. The action plan generator 140 may identify the type of the preceding vehicle mA on the basis of the width, height and the like of the preceding vehicle mA.

Next, the action plan generator 140 determines whether a continuity of a route on which the host vehicle M is currently traveling is decreasing (step S106). "Continuity of a route decreases" means a situation in which, when a route along which the host vehicle M is currently traveling is a main line (also called a main road) such as an expressway, a distance between the host vehicle M and a branch point PB at which a branch line branches from the main line gradually decreases when the host vehicle M needs to change lanes from the main line to the branch line at the branch point PB. For example, it is assumed that one or more branch lines branch from the main line and include a branch line reaching a destination of the host vehicle M. In this case, the host vehicle M needs to change lanes from the main line to the branch line reaching the destination thereof at the branch point PB. That is, the end point of the route (main line) through which the host vehicle M is currently traveling is the branch point PB, a distance over which the host vehicle M can continuously travel along the main line decreases as the host vehicle M approaches the branch point PB, and thus the "continuity" of the main line decreases.

Accordingly, the action plan generator 140 determines that "continuity of the route decreases," for example, when a route reaching the destination branches from the route on which the host vehicle M is currently traveling as a branch line and determines that "continuity of the route does not decrease" when the destination is present on an extension of the route on which the host vehicle M is currently traveling.

When it is determined that a continuity of the route does not decrease, the action plan generator 140 determines whether at least one of a first condition and a second condition is satisfied (step S108).

The first condition is a condition according to the relative speed Vr of the host vehicle M with respect to the preceding vehicle mA. For example, the first condition may be a condition that the relative speed Vr of the host vehicle M with respect to the preceding vehicle mA is equal to or greater than a certain threshold value (hereinafter referred to as a speed threshold value ThV). The first condition may include a condition that a relative distance between the host vehicle M and the preceding vehicle mA is equal to or greater than a threshold value and a condition that a time-to-collision (TTC) obtained by dividing the relative distance between the host vehicle M and the preceding vehicle mA by the relative speed Vr of the host vehicle M with respect to the preceding vehicle mA is equal to or greater than a threshold value in addition to or instead of the condition that the relative speed Vr of the host vehicle M with respect to the preceding vehicle mA is equal to or greater than the speed threshold value ThV. The speed threshold value ThV is an example of a "first threshold value."

The second condition is a condition according to the type of the preceding vehicle mA. For example, the second condition may include a condition that the type of the preceding vehicle mA is consistent with any one of a plurality of predetermined vehicle types. The plurality of vehicle types have different overall lengths. Accordingly, the second condition may be a condition that the type of the preceding vehicle mA is a vehicle type having an overall vehicle length of equal to or less than a certain threshold value (hereinafter referred to as an overall length threshold value ThL). The overall length threshold value ThL is an example of a "second threshold value."

For example, the action plan generator 140 may determine that the first condition is satisfied when the relative speed Vr is equal to or greater than the speed threshold value ThV, that is, the speed of the host vehicle M is higher than the speed of the preceding vehicle mA by the speed threshold value ThV or more, and determine that the first condition is not satisfied when the relative speed Vr is less than the speed threshold value ThV. For example, the action plan generator 140 may determine that the second condition is satisfied when the type of the preceding vehicle mA is a vehicle type having a vehicle overall length equal to or less than the overall length threshold value ThL and determine that the second condition is not satisfied when the type of the preceding vehicle mA is a vehicle type having a vehicle overall length exceeding the overall length threshold value ThL. A vehicle type having a vehicle overall length equal to or less than the overall length threshold value ThL is an example of a "first vehicle type" and a vehicle type having a vehicle overall length exceeding the overall length threshold value ThL is an example of a "second vehicle type."

When it is determined that at least one of the first condition and the second condition is satisfied, the action plan generator 140 determines an event of a current section as a passing event in order to pass the preceding vehicle mA and generates a target trajectory on the basis of the passing event. In response to this, the second controller 160 causes the host vehicle M to pass the preceding vehicle mA by controlling the steering and speed of the host vehicle M on the basis of the target trajectory (step S110). "Passing" may further include "overtaking" such as an action in which the host vehicle M appears in front of the preceding vehicle mA without changing lanes, in addition to an action in which the host vehicle M following the preceding vehicle mA changes lanes from the host lane to a neighboring lane, appears in front of the preceding vehicle mA in the neighboring lane and then changes lanes to the previous lane.

On the other hand, when it is determined that at least one of the first condition and the second condition is not satisfied, the action plan generator 140 maintains the current event without changing it. For example, when the current event is a following travel event of causing the host vehicle M to follow the preceding vehicle mA, the second controller 160 may control at least the speed of the host vehicle M such that the host vehicle M continuously follows the preceding vehicle mA.

Meanwhile, when the action plan generator 140 determines that a continuity of the route decreases in the process of S106, the action plan generator 140 changes the first condition and the second condition (step S112). The action plan generator 140 may change any one of the first condition and the second condition instead of changing both the first condition and the second condition.

Figure 4:
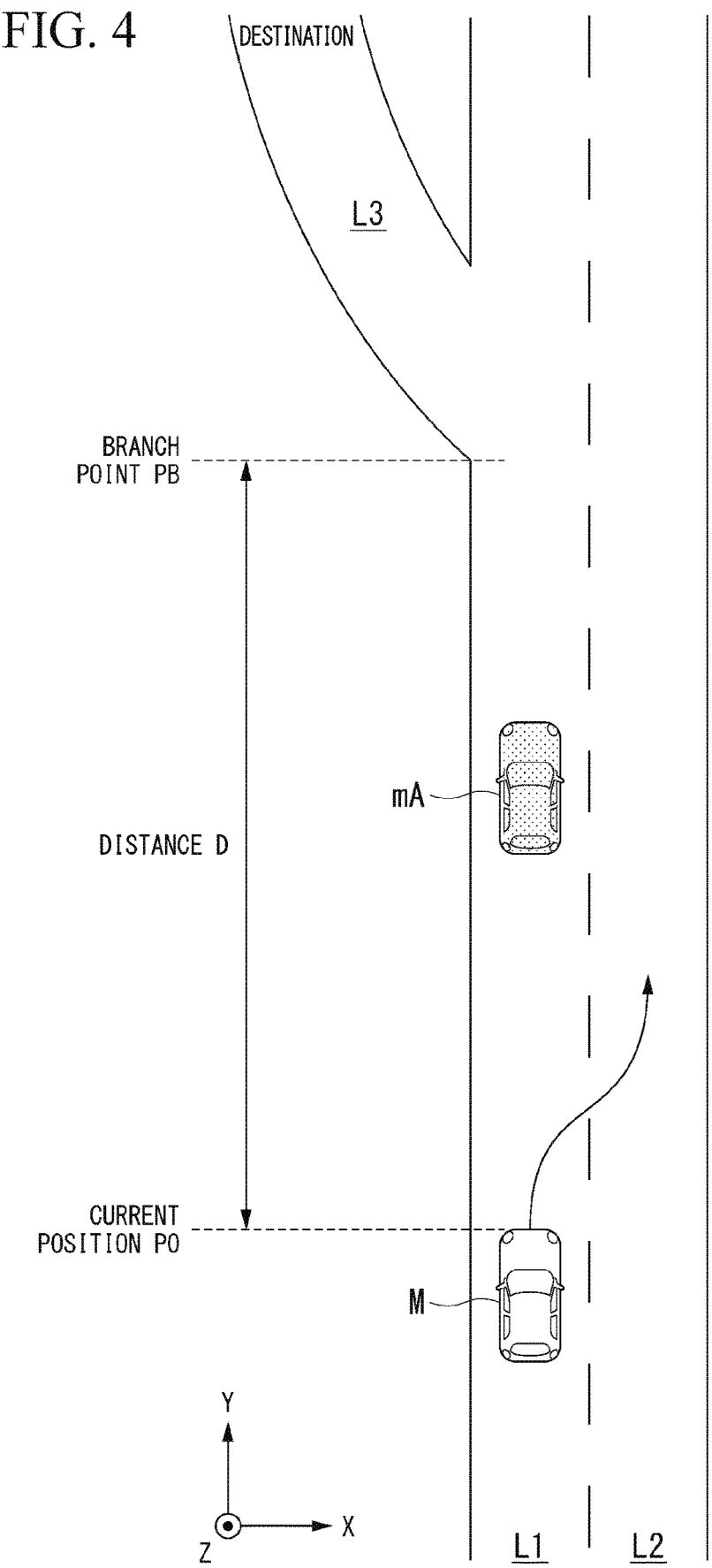
FIG. 4 is a diagram showing an example of a situation in which a preceding vehicle is present.

FIG. 4 is a diagram showing an example of a situation in which the preceding vehicle mA is present. In the figure, L1 and L2 represent a main line such as an expressway and L3 represents a branch line branched from the main line. A destination of the host vehicle M is present ahead of the branch line L3. In such a situation, the host vehicle M branches from the lane L1 that is a part of the main line to the branch line L3 and thus the continuity of the route decreases. Accordingly, the action plan generator 140 determines that a continuity of the route decreases and changes the first condition and the second conditions.

For example, the action plan generator 140 may change the speed threshold value ThV or the overall length threshold value ThL in response to a distance D between a current position P0 of the host vehicle M and a branch point PB with reference to the speed threshold value information 182, the overall length threshold value information 184, and the vehicle type information 186.

FIG. 5 is a diagram showing an example of the speed threshold value information 182 according to the first embodiment. As shown in the illustrated example, the speed threshold value information 182 according to the first embodiment is information defining a value of the speed threshold value ThV with respect to the distance D and represents that the speed threshold value ThV is constant when a continuity of a route does not decrease and the speed threshold value ThV changes in response to the distance D when the continuity of the route decreases.

For example, the action plan generator 140 may decrease the speed threshold value ThV as the distance D increases and increase the speed threshold value ThV as the distance D decreases according to the speed threshold value information 182 when a continuity of the route decreases. In other words, the action plan generator 140 increases the speed threshold value ThV as the host vehicle M approaches the branch point PB. Accordingly, the relative speed Vr is unlikely to become equal to or greater than the speed threshold value ThV as the host vehicle M approaches the branch point PB even when the relative speed Vr of the host vehicle M with respect to the preceding vehicle mA is constant, and thus it is easily determined that the first condition is not satisfied. As a result, passing control of causing the host vehicle M to pass the preceding vehicle mA is curbed when the host vehicle M approaches the branch point PB.

FIG. 6 is a diagram showing an example of the overall length threshold value information 184 according to the first embodiment. As shown in the illustrated example, the overall length threshold value information 184 according to the first embodiment is information defining a value of the overall length threshold value ThL with respect to the distance D and represents that the overall length threshold value ThL is constant when a continuity of a route does not decrease and the overall length threshold value ThL changes in response to the distance D when the continuity of the route decreases.

For example, the action plan generator 140 may increase the overall length threshold value ThL as the distance D increases and decrease the overall length threshold value ThL as the distance D decreases according to the overall length threshold value information 184 when a continuity of the route decreases. In other words, the action plan generator 140 limits the number of vehicle types having overall lengths equal to or less than the overall length threshold value ThL as the host vehicle M approaches the branch point PB. Accordingly, the overall length of the preceding vehicle mA hardly becomes equal to or less than the overall length threshold value ThL as the host vehicle M approaches the branch point PB even when the preceding vehicle mA has the same overall length, and thus it is easily determined that the second condition is not satisfied. As a result, passing control of causing the host vehicle M to pass the preceding vehicle mA is curbed when the host vehicle M approaches the branch point PB.

In general, in a situation in which a branch line needs to branch from the main line at the branch point PB, an occupant often avoids various types of lane change including passing and the like consciously or unconsciously when approaching the branch point PB. Accordingly, the action plan generator 140 performs passing control closer to the feelings of the occupant by curbing passing control when the host vehicle M approaches the branch point PB.

FIG. 7 is a diagram showing an example of the vehicle type information 186 according to the first embodiment. As shown in the illustrated example, the vehicle type information 186 is information in which overall lengths, widths, heights, and the like of vehicles are associated with a plurality of predetermined vehicle types. When the action plan generator 140 determines whether the second condition is satisfied, if the type of the preceding vehicle mA is identified, the action plan generator 140 selects a vehicle type consistent with the identified type of the preceding vehicle mA from the plurality of vehicle types of the vehicle type information 186 and estimates a numerical value associated with the selected vehicle type as an overall length as the overall length of the preceding vehicle mA. Then, the action plan generator 140 determines whether the second condition is satisfied by comparing the estimated overall length of the preceding vehicle mA with the overall length threshold value ThL. As described above, since the overall length threshold value ThL increases as the distance D increases and decreases as the distance D is decreases, the number of vehicle types having an overall length equal to or less than the overall length threshold value ThL is increasingly limited and thus the second condition made less likely to be satisfied.

When the first condition and the second condition are changed in response to the distance D, the action plan generator 140 proceeds to the process of S108 and determines whether at least one of the first condition and the second condition is satisfied. Since the first condition and the second condition are changed such that it become more likely to be determined that they are not satisfied, the action plan generator 140 does not proceed to the process of S110 and easily maintains the current event without changing it. As a result, passing control of causing the host vehicle M to pass the preceding vehicle mA is curbed.

According to the above-described first embodiment, the automated driving control device 100 determines whether at least one of the first condition according to the relative speed Vr of the host vehicle M with respect to the preceding vehicle mA and the second condition according to the type of the preceding vehicle mA is satisfied when the preceding vehicle mA in the host lane is recognized, performs passing control of causing the host vehicle M to pass the preceding vehicle mA when it is determined that at least one condition is satisfied, and curbs passing control by changing the first condition and the second condition when a continuity of the route on which the host vehicle M is currently traveling decreases. Consequently, passing control closer to the feelings of an occupant can be performed.

Second Embodiment

Hereinafter, a second embodiment will be described. In the above-described first embodiment, when a destination input by an occupant to the HMI 30 or the navigation HMI 52 is present ahead of a lane branched from a main line on which the host vehicle M is currently traveling, the first condition and the second condition are changed in response to a distance D to the branch point PB to curb passing control. In contrast, the second embodiment differs from the first embodiment in that the first condition and the second condition are changed to curb passing control even when an occupant does not input a destination to the HMI 30 or the navigation HMI 52. Hereinafter, description will focus on differences from the first embodiment and description of common points to the first and second embodiments will be omitted. In description of the second embodiment, parts the same as those of the first embodiment are denoted by the same reference signs.

Figure 8:
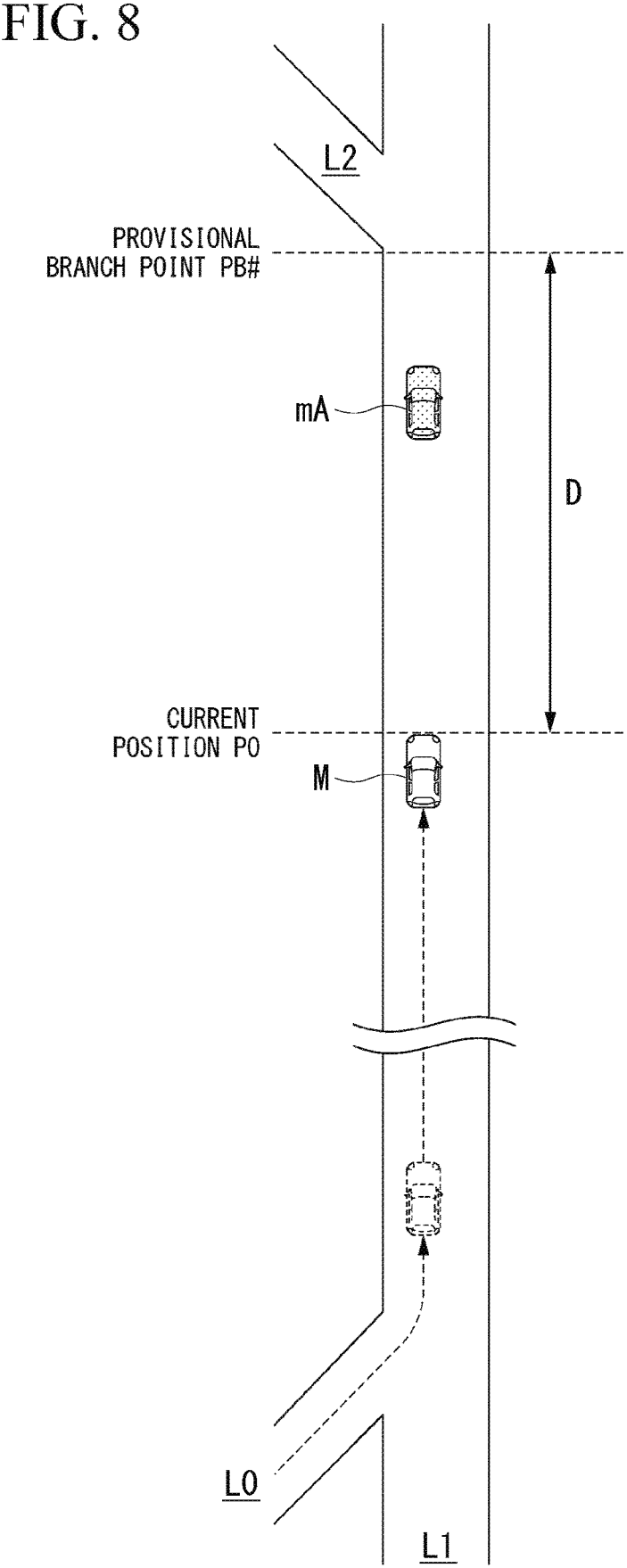
FIG. 8 is a diagram showing an example of a situation in which a preceding vehicle is present when a destination is not set.

FIG. 8 is a diagram showing an example of a situation in which the preceding vehicle mA is present when a destination is not set. In the figure, L1 represents a main line such as an expressway, L0 represents a branch line L0 merging into the main line L1, and L2 represents a branch line branching from the main line L1.

For example, when the host vehicle M has merged into the main line L1 from the branch line L0, the action plan generator 140 determines an event of the current section as a constant-speed travel event and a following travel event and generates a target trajectory according to these events. The second controller 160 causes the host vehicle M to travel along the road of the main line L1 by controlling the steering and speed of the host vehicle M along the target trajectory according to the constant-speed travel event and the following travel event.

Here, although a destination is not set, a destination is likely to be present ahead of the branch line L2 branched from the main line L1. Accordingly, when the host vehicle M is traveling along the road of the main line L1, an occupant is likely to cause the host vehicle M to be branched to the branch line L2 according to manual driving. Particularly, it is highly probable that the occupant will cause the host vehicle M to branch to the branch line L2 according to manual driving at a branch point at which the host vehicle M is assumed to arrive after entering the main line L1 and traveling a predetermined distance or after a predetermined time.

Accordingly, the action plan generator 140 changes the speed threshold value ThV or the overall length threshold value ThL in response to a distance D between the current position P0 of the host vehicle M and a branch point at which the host vehicle M is assumed to arrive after entering the main line L1 and then traveling a predetermined distance or for a predetermined time, in other words, a branch point (hereinafter referred to as a provisional branch point PB #) at which the occupant can cause the host vehicle M to be branched from the main line. In this manner, the first condition and the second condition are changed under a situation in which a continuity of a route on which the host vehicle M is currently traveling may decrease even when a destination is not set in advance, and thus passing control closer to the feelings of an occupant can be performed.

Although there is a single branch point at which the host vehicle M is assumed to arrive after entering the main line L1 and then traveling a predetermined distance or for a predetermined time in the above description, the present invention is not limited thereto. For example, the action plan generator 140 may change the first condition and the second condition in response to the distance D between each branch point and the host vehicle M even when there are a plurality of branch points at which the host vehicle M is assumed to arrive after traveling a predetermined distance or for a predetermined time from entering the main line L1.

Figure 9:
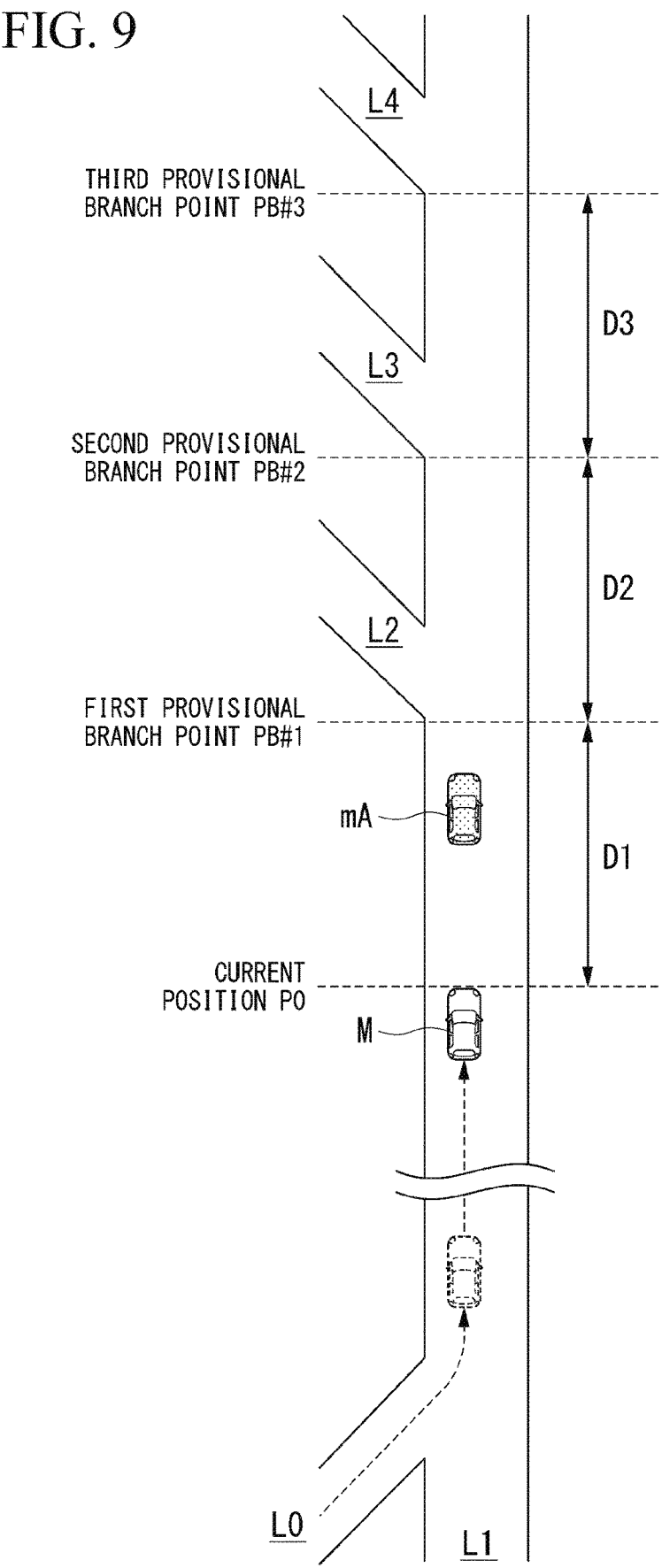
FIG. 9 is a diagram showing another example of a situation in which a preceding vehicle is present when a destination is not set.

FIG. 9 is a diagram showing another example of a situation in which the preceding vehicle mA is present when a destination is not set. In the figure, L2 to L4 represent branch lines branching from a main line L1. PB #1 represents a first provisional branch point closest to the host vehicle M, PB #2 represents a second provisional branch point next closest to the host vehicle M after the first provisional branch point PB #1, and PB #3 represents a third provisional branch point next closest to the host vehicle M after the second provisional branch point PB #2. D1 represents a distance from the current position P0 of the host vehicle M to the first provisional branch point PB #1, D2 represents a distance from the first provisional branch point PB #1 to the second provisional branch point PB #2, and D3 represents a distance from the second provisional branch point PB #2 to the third provisional branch point PB #3.

As illustrated, when three provisional branch points PB #at which the host vehicle M is assumed to arrive after entering the main line L1 and then traveling a predetermined distance or for a predetermined time are present, the action plan generator 140 changes the first condition and the second condition in response to the distances D1 to D3.

Figure 10:
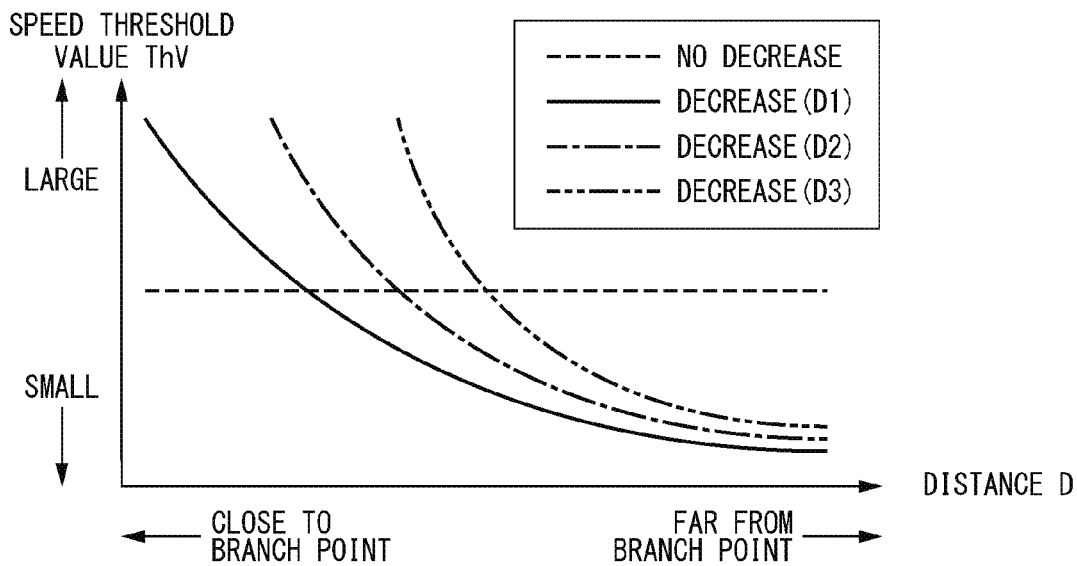
FIG. 10 is a diagram showing an example of speed threshold value information according to a second embodiment.

FIG. 10 is a diagram showing an example of the speed threshold value information 182 according to the second embodiment. As shown in the illustrated example, the speed threshold value information 182 according to the second embodiment is information defining a value of the speed threshold value ThV with respect to a distance D and represents that the speed threshold value ThV is constant when a continuity of a route does not decrease and the speed threshold value ThV changes in response to a distance D to each provisional branch point PB #when the continuity of the route may decrease because provisional branch points PB #are present.

For example, when the host vehicle M has passed through the first provisional branch point PB #1 without branching, it is highly probable that the host vehicle M will branch at the second provisional branch point PB #2 or the third provisional branch point PB #3.

Accordingly, when three provisional branch points PB #are present, the action plan generator 140 strengthens the trend of decreasing the speed threshold value ThV in response to increase in the distance D and increases the speed threshold value ThV in response to decrease in the distance D for a provisional branch point PB #furthest from the host vehicle M from among the three provisional branch points PB #. Specifically, the action plan generator 140 increases a variation in the speed threshold value ThV with respect to the distance D2 to the second provisional branch point PB #2 such that it becomes larger than a variation in the speed threshold value ThV with respect to the distance D1 to the first provisional branch point PB #1 and increases variation in the speed threshold value ThV with respect to the distance D3 to the third provisional branch point PB #3 to be larger than variation in the speed threshold value ThV with respect to the distance D2 to the second provisional branch point PB #2. Accordingly, it is possible to perform passing control closer to the feelings of an occupant even when a destination is not set.

Figure 11:
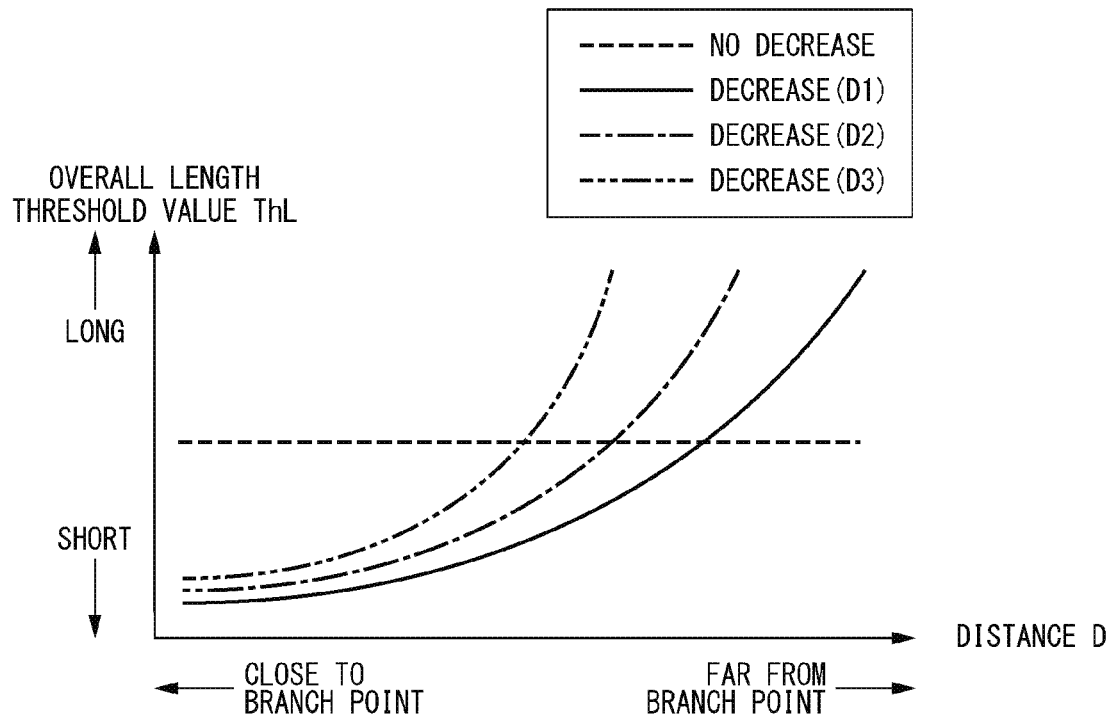
FIG. 11 is a diagram showing an example of overall length threshold value information according to the second embodiment.

FIG. 11 is a diagram showing an example of the overall length threshold value information 184 according to the second embodiment. As shown in the illustrated example, the overall length threshold value information 184 according to the second embodiment is information defining a value of the overall length threshold value ThL with respect to a distance D and represents that the overall length threshold value ThL is constant when a continuity of a route does not decrease and the overall length threshold value ThL changes in response to a distance D to each provisional branch point PB #when the continuity of the route may decrease because provisional branch points PB #are present.

For example, like the speed threshold value information 182, when three provisional branch points PB #are present, the action plan generator 140 strengthens the tendency to increase the overall length threshold value ThL in response to increase in the distance D and decreases the overall length threshold value ThL in response to decrease in the distance D for a provisional branch point PB #farther from the host vehicle M from among the three provisional branch points PB #. Specifically, the action plan generator 140 increases variation in the overall length threshold value ThL with respect to the distance D2 to the second provisional branch point PB #2 to be larger than variation in the overall length threshold value ThL with respect to the distance D1 to the first provisional branch point PB #1 and increases variation in the overall length threshold value ThL with respect to the distance D3 to the third provisional branch point PB #3 to be larger than variation in the overall length threshold value ThL with respect to the distance D2 to the second provisional branch point PB #2. Accordingly, it is possible to perform passing control closer to the feelings of an occupant even when a destination is not set.

According to the above-described second embodiment, the automated driving control device 100 changes the first condition and the second condition in response to a distance D to a provisional branch point PB #when the provisional branch point PB #is present and thus a continuity of a route may decrease, and thus passing control can be curbed as the host vehicle M approaches the provisional branch point PB #even when an occupant has not set a destination using the HMI 30 or the navigation HMI 52. Consequently, it is possible to perform passing control closer to the feelings of the occupant.

Third Embodiment

Hereinafter, a third embodiment will be described. The third embodiment differs from the above-described first and second embodiments in that the speed (hereinafter referred to as a reference speed $V_x$) of the host vehicle M which is a reference in automated driving is set by an occupant using the HMI 30 or the navigation HMI 52. The reference speed $V_x$ of the host vehicle M in automated driving includes, for example, a maximum speed, a minimum speed, and the like when the host vehicle M is caused to travel at a constant speed as in ACC. Hereinafter, description will focus on differences from the first and second embodiments and description of common points to the first to third embodiments will be omitted. In description of the third embodiment, parts the same as those of the first and second embodiments are denoted by the same reference signs.

The action plan generator 140 according to the third embodiment determines whether the reference speed $V_x$ set by an occupant is identical to a speed limit (regulation speed) V1 of a route through which the host vehicle M is traveling and changes the first condition and the second condition in response to a difference ΔV between the reference speed $V_x$ and the speed limit V1 when the reference speed $V_x$ differs from the speed limit V1. Speeds are "identical" does not mean that they are completely consistent with each other and, for example, may mean that a certain degree of error is allowed.

For example, there may be a case in which a speed limit V1 is 100 km/h in a section of an expressway and 120 km/h in another section of the expressway. In such a case, it is conceivable that an occupant set the reference speed $V_x$ of the host vehicle M to 110 km/h by taking an intermediate value between the two values. An occupant who sets the reference speed $V_x$ higher than the speed limit V1 tends to desire swift travel and an occupant who sets the reference speed $V_x$ lower than the speed limit V1 tends to focus on stability and ride quality.

In response to this, the action plan generator 140 determines whether the reference speed $V_x$ set by the occupant is identical to the speed limit V1 of the route through which the host vehicle M is traveling and changes the first condition and the second condition in response to the difference ΔV between the reference speed $V_x$ and the speed limit V1 when the reference speed $V_x$ is higher than the speed limit V1.

Figure 12:
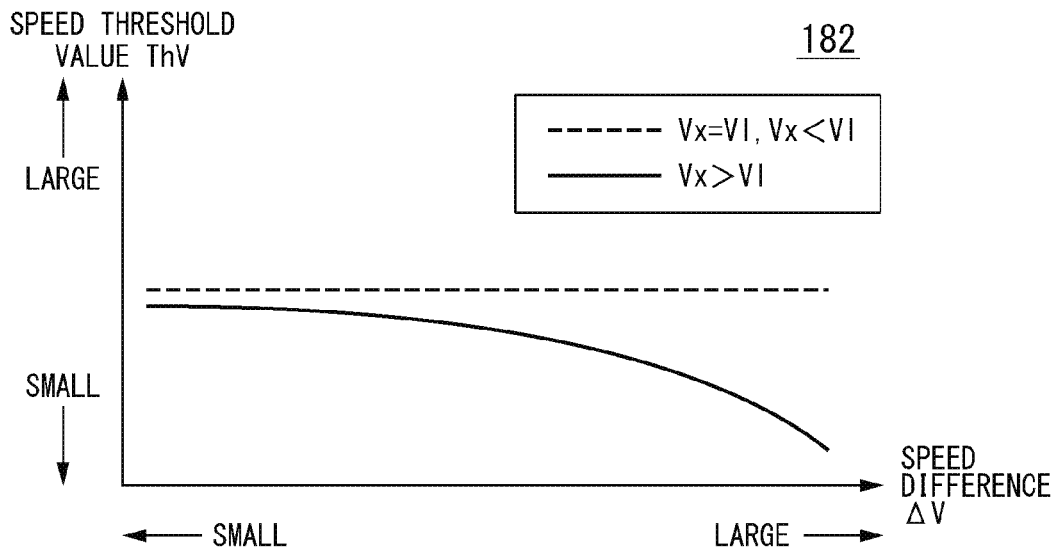
FIG. 12 is a diagram showing an example of speed threshold value information according to a third embodiment.

FIG. 12 is a diagram showing an example of the speed threshold value information 182 according to the third embodiment. As shown in the illustrated example, the speed threshold value information 182 according to the third embodiment is information defining a value of the speed threshold value ThV with respect to the speed difference ΔV and represents that the speed threshold value ThV is constant when the reference speed $V_x$ is identical to the speed limit V1 ($V_x \approx$V1) or when the reference speed $V_x$ is lower than the speed limit V1 ($V_x<$V1) and the speed threshold value ThV changes in response to the speed difference ΔV when the reference speed $V_x$ is higher than the speed limit V1 ($V_x>$V1).

For example, the action plan generator 140 decreases the speed threshold value ThV as the speed different ΔV increases and increases the speed threshold value ThV as the speed different ΔV decreases according to the speed threshold value information 182 when the reference speed $V_x$ is higher than the speed limit V1. Accordingly, passing control is less likely to be performed frequently when an occupant of the host vehicle M is a user who wants to travel at a speed identical to or lower than the speed limit, whereas passing control is more likely to be performed when the occupant of the host vehicle M is a user who wants to travel at a speed equal to or higher than the speed limit, for example.

Figure 13:
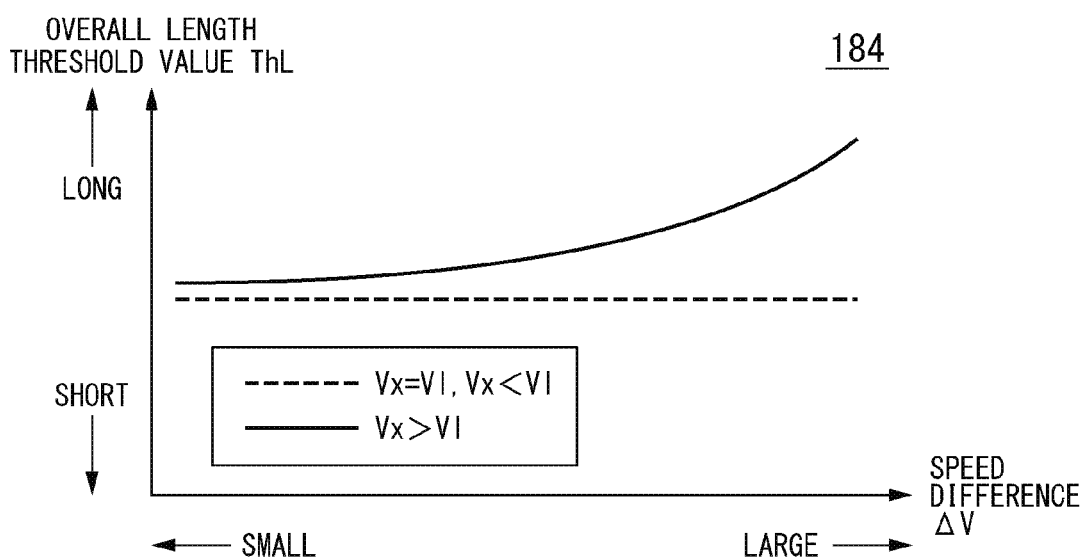
FIG. 13 is a diagram showing an example of overall length threshold value information according to the third embodiment.

FIG. 13 is a diagram showing an example of the overall length threshold value information 184 according to the third embodiment. As shown in the illustrated example, the overall length threshold value information 184 according to the third embodiment is information defining a value of the overall length threshold value ThL with respect to the speed difference ΔV and represents that the overall length threshold value ThL is constant when the reference speed $V_x$ is identical to the speed limit V1 ($V_x \approx$V1) or when the reference speed $V_x$ is lower than the speed limit V1 ($V_x<$V1) and the overall length threshold value ThL changes in response to the speed difference ΔV when the reference speed $V_x$ is higher than the speed limit V1 ($V_x>$V1).

For example, the action plan generator 140 increases the overall length threshold value ThL as the speed different ΔV increases and decreases the overall length threshold value ThL as the speed different ΔV decreases according to the overall length threshold value information 184 when the reference speed $V_x$ is higher than the speed limit V1. Accordingly, passing control may be hardly frequently performed when an occupant of the host vehicle M is a user who wants to travel at a speed identical to or lower than the speed limit, whereas passing control may be easily frequently performed when the occupant of the host vehicle M is a user who wants to travel at a speed equal to or higher than the speed limit, for example.

According to the above-described third embodiment, when the reference speed $V_x$ set by an occupant is higher than the speed limit V1 of a route through which the host vehicle M is traveling, the first condition and the second condition are changed such that passing control is curbed more strongly as the difference ΔV between the reference speed $V_x$ and the speed limit V1 decreases and the first condition and the second condition are changed such that passing control is easily performed as the difference Δ between the reference speed $V_x$ and the speed limit V1 increases. Consequently, it is possible to perform passing control in accordance with the feelings of an occupant of whether he/she tends to desire swift travel or tends to focus on stability and ride quality.

Fourth Embodiment

Hereinafter, a fourth embodiment will be described. The fourth embodiment differs from the first to third embodiments in that the number of times an occupant operates a winker lever to instruct lane change to neighboring lanes is counted and the first condition and the second condition are changed in response to the counted number. Hereinafter, description will focus on differences from the first to third embodiments and description of common points to the first to fourth embodiments will be omitted. In description of the fourth embodiment, parts the same as those of the first to third embodiments are denoted by the same reference signs.

Figure 14:
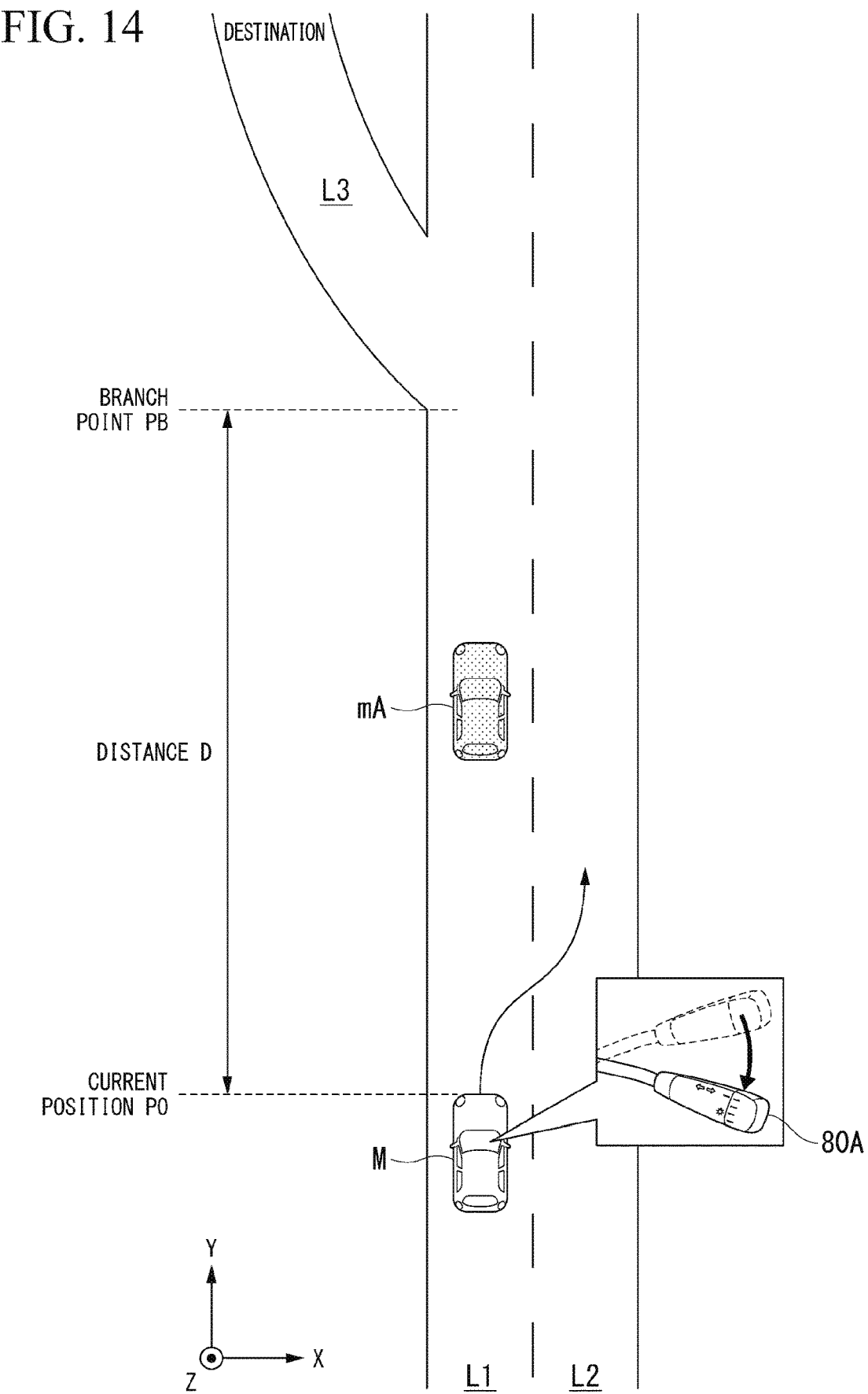
FIG. 14 is a diagram showing another example of a situation in which a preceding vehicle is present.

FIG. 14 is a diagram showing another example of a situation in which the preceding vehicle mA is present. In the figure, 80A represents a winker lever. The winker lever 80A is an example of a "detector."

As shown in the illustrated example, when the preceding vehicle mA is present in front of the host vehicle M, there are cases in which an occupant operates the winker lever 80A to instruct the host vehicle M to change lanes to a neighboring lane L2. In this case, the action plan generator 140 counts the number of times of operating the winker lever 80A.

For example, an occupant who operates the lever 80A a large number of times is unlikely to have a feeling of resistance to repeated lane change for passing and tends to desire swift travel. On the other hand, an occupant who operates the lever 80A a small number of times is likely to have a feeling of resistance to repeated lane change for passing and tends to focus on stability and ride quality rather than swift travel.

Accordingly, the action plan generator 140 decreases the speed threshold value ThV as the counted number of times of operating the lever 80A increases and increases the speed threshold value ThV as the number of times of operating the lever 80A decreases. The action plan generator 140 increases the overall length threshold value ThL as the number of times of operating the lever 80A increases and decreases the overall length threshold value ThL as the number of times of operating the lever 80A decreases. Accordingly, passing control is more frequently performed as the number of times of operating the lever 80A increases and passing control is more strongly curbed as the number of times of operating the lever 80A decreases.

Although the number of times of an occupant operating the winker lever 80A is counted and the first condition and the second condition are changed in response to the counted number in the fourth embodiment, the present invention is not limited thereto. For example, the action plan generator 140 may measure an operation time of the lever 80A when an occupant operates the winker lever 80A to instruct lane change to a neighboring lane and change the first condition and the second condition in response to the measured operation time of the lever 80A.

Specifically, the action plan generator 140 decreases the speed threshold value ThV as the operation time of the lever 80A increases and increases the speed threshold value ThV as the operation time of the lever 80A decreases. The action plan generator 140 increases the overall length threshold value ThL as the operation time of the lever 80A increases and decreases the overall length threshold value ThL as the operation time of the lever 80A decreases. Accordingly, passing control is more frequently performed as the operation time of the lever 80A increases and passing control is more strongly curbed as the operation time of the lever 80A decreases.

According to the above-described fourth embodiment, since the number of times of an occupant operating the winker lever to instruct lane change to neighboring lanes is counted and the first condition and the second condition are changed in response to the counted number, it is possible to perform passing control in accordance with the feelings of an occupant of whether he/she tends to desire swift travel or tends to focus on stability and ride quality.

[Hardware Configuration]

Figure 15:
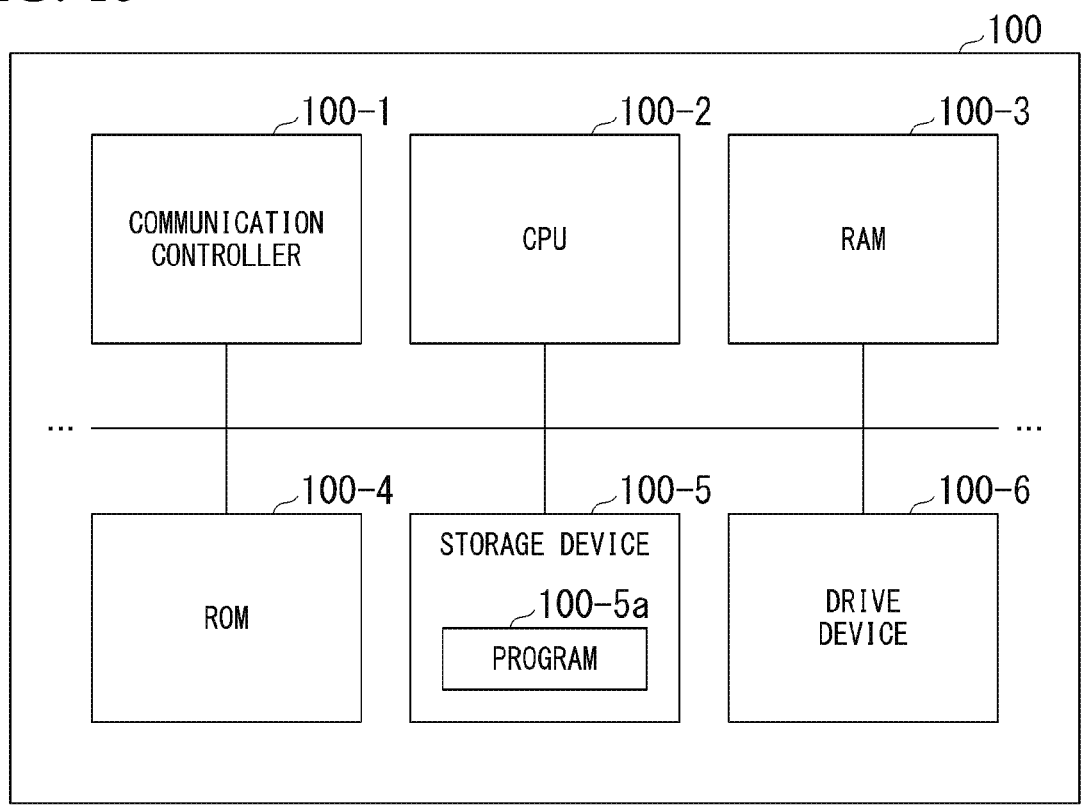
FIG. 15 is a diagram showing an example of a hardware configuration of the automated driving control device of embodiments.

FIG. 15 is a diagram showing an example of a hardware configuration of the automated driving control device 100 of embodiments. As illustrated, the automated driving control device 100 has a configuration in which a communication controller 100-1, a CPU 100-2, a RAM 100-3 used as a working memory, a ROM 100-4 storing a boot program and the like, a storage device 100-5 such as a flash memory or an HDD, a drive device 100-6, and the like are connected through an internal bus or a dedicated communication line. The communication controller 100-1 performs communication with components other than the automated driving control device 100. A program 100-5a executed by the CPU 100-2 is stored in the storage device 100-5. This program is developed in the RAM 100-3 according to a Direct Memory Access (DMA) controller (not shown) or the like and executed by the CPU 100-2. Accordingly, parts or all of the first controller and the second controller 160 are realized.

The above-described embodiments can be represented as follows.

A vehicle control apparatus including:
at least one memory which stores a program; and
at least one processor,
wherein the processor is configured to, by executing the program:
recognize a surrounding situation of a host vehicle;
perform automated driving of controlling at least one of a speed and steering of the host vehicle on the basis of the recognition result;
when a preceding vehicle present in front of the host vehicle in a host lane in which the host vehicle is present is recognized, perform passing control of causing the host vehicle to pass the preceding vehicle if at least one of a first condition according to a relative speed of the host vehicle with respect to the preceding vehicle and a second condition according to a type of the preceding vehicle is satisfied; and
curb the following control by changing at least one of the first condition and the second condition when a continuity of a first route on which the host vehicle is traveling decreases.

While forms for embodying the present invention have been described using embodiments, the present invention is not limited to these embodiments and various modifications and substitutions can be made without departing from the spirit or scope of the present invention.

What is claimed is:

1. A vehicle control apparatus comprising:
a recognizer which is configured to recognize a surrounding environment of a host vehicle; and
a driving controller which is configured to perform automated driving of controlling at least one of a speed and steering of the host vehicle on the basis of a recognition result of the recognizer,
wherein the driving controller is configured to perform passing control of causing the host vehicle to pass a preceding vehicle present in front of the host vehicle in a host lane in which the host vehicle is present if at least one of a first condition according to a relative speed of the host vehicle with respect to the preceding vehicle and a second condition according to a type of the preceding vehicle is satisfied when the recognizer recognizes the preceding vehicle, and
is configured to curb the passing control by changing at least one of the first condition and the second condition when a continuity of a first route on which the host vehicle is traveling decreases.

2. The vehicle control apparatus according to claim 1, wherein the first condition includes a condition that the relative speed of the host vehicle with respect to the preceding vehicle is equal to or greater than a first threshold value and the second condition includes a condition that the type of the preceding vehicle is consistent with any of a plurality of predetermined vehicle types, and
the driving controller is configured to curb the passing control by increasing the first threshold value or limiting the plurality of vehicle types.

3. The vehicle control apparatus according to claim 2, wherein the driving controller is configured to increase the first threshold value or limits the plurality of vehicle types to a larger number as a continuity of the first route decreases.

4. The vehicle control apparatus according to claim 1, wherein decrease in a continuity of the first route includes decrease in a distance between the host vehicle and a branch point at which a second route on which a vehicle traveling direction differs from the first route is branched from the first route, and
wherein the driving controller is configured to curb the passing control in response to decrease in the distance between the branch point and the host vehicle.

5. The vehicle control apparatus according to claim 4, further comprising an inputter to which a destination is input,
wherein, when the destination input to the inputter is present ahead of the second route, the driving controller is configured to curb the passing control in response to decrease in the distance between the branch point to the second route and the host vehicle.

6. The vehicle control apparatus according to claim 4, further comprising an inputter to which a destination is input,
wherein, when the destination is not input to the inputter, the driving controller is configured to curb the passing control in response to decrease in a distance between the host vehicle and a branch point at which the host vehicle is assumed to arrive after traveling a predetermined distance or for a predetermined time on the first route.

7. The vehicle control apparatus according to claim 6, wherein, when the host vehicle is assumed to arrive at a plurality of branch points after traveling a predetermined distance or for a predetermined time on the first route, the driving controller is configured to curb the passing control when the host vehicle approaches each of the plurality of branch points.

8. The vehicle control apparatus according to claim 7, wherein the driving controller is configured to curb the passing control more strongly for a branch point farther from the host vehicle from among the plurality of branch points.

9. The vehicle control apparatus according to claim 1, further comprising an inputter to which a reference speed of the host vehicle in the automated driving is input,
wherein, when the reference speed input to the inputter is lower than a speed limit of the first route, the driving controller is configured to curb the passing control in contrast to a case in which the reference speed is higher than the speed limit.

10. The vehicle control apparatus according to claim 9, wherein the driving controller is configured to curb the passing control more strongly as a difference between the reference speed and the speed limit decreases when the reference speed is higher than the speed limit.

11. The vehicle control apparatus according to claim 1, wherein the first condition includes a condition that the relative speed of the host vehicle with respect to the preceding vehicle is equal to or greater than a first threshold value and the second condition includes a condition that an overall length of the preceding vehicle is equal to or less than a second threshold value, and wherein the driving controller is configured to curb the passing control by increasing the first threshold value or decreasing the second threshold value.

12. The vehicle control apparatus according to claim 11, wherein the driving controller is configured to not curb the passing control when the type of the preceding vehicle is a first vehicle type having a vehicle overall length equal to or less than the second threshold value and is configured to curb the passing control when the type of the preceding vehicle is a second vehicle type having a vehicle overall length greater than the second threshold value.

13. The vehicle control apparatus according to claim 1, further comprising a detector which detects an operation of an occupant of the host vehicle to instruct lane change, wherein the driving controller is configured to curb the passing control on the basis of the number of times of detecting the operation by the detector.

14. The vehicle control apparatus according to claim 13, wherein the driving controller is configured to curb the passing control more strongly as the number of times of detecting the operation by the detector decreases.

15. A vehicle control method, using a computer mounted in a host vehicle, comprising:

recognizing a surrounding environment of a host vehicle;

performing automated driving of controlling at least one of a speed and steering of the host vehicle on the basis of the recognition result;

performing passing control of causing the host vehicle to pass a preceding vehicle present in front of the host vehicle in a host lane in which the host vehicle is present if at least one of a first condition according to a relative speed of the host vehicle with respect to the preceding vehicle and a second condition according to a type of the preceding vehicle is satisfied when the preceding vehicle is recognized; and curbing the passing control by changing at least one of the first condition and the second condition when a continuity of a first route on which the host vehicle is traveling decreases.

16. A computer-readable non-transitory storage medium storing a program for causing a computer mounted in a host vehicle to execute:

recognizing a surrounding environment of a host vehicle;

performing automated driving of controlling at least one of a speed and steering of the host vehicle on the basis of the recognition result;

performing passing control of causing the host vehicle to pass a preceding vehicle present in front of the host vehicle in a host lane in which the host vehicle is present if at least one of a first condition according to a relative speed of the host vehicle with respect to the preceding vehicle and a second condition according to a type of the preceding vehicle is satisfied when the preceding vehicle is recognized; and curbing the passing control by changing at least one of the first condition and the second condition when a continuity of a first route on which the host vehicle is traveling decreases.

* * * * *